(12) United States Patent
Yamaguchi et al.

(10) Patent No.: US 7,722,922 B2
(45) Date of Patent: May 25, 2010

(54) COATING APPARATUS FOR AN ALUMINUM ALLOY HEAT EXCHANGER MEMBER, METHOD OF PRODUCING A HEAT EXCHANGER MEMBER, AND ALUMINUM ALLOY HEAT EXCHANGER MEMBER

(75) Inventors: Hirokazu Yamaguchi, Tokyo (JP); Toshiki Maezono, Tokyo (JP); Takashi Kashima, Tokyo (JP); Masami Kojima, Tokyo (JP); Yoji Hirano, Tokyo (JP)

(73) Assignee: Furukawa-Sky Aluminum Corp., Tokyo (JP)

( * ) Notice: Subject to any disclaimer, the term of this patent is extended or adjusted under 35 U.S.C. 154(b) by 1018 days.

(21) Appl. No.: 11/404,752

(22) Filed: Apr. 17, 2006

(65) Prior Publication Data
US 2006/0243778 A1 Nov. 2, 2006

Related U.S. Application Data

(63) Continuation of application No. PCT/JP2004/015745, filed on Oct. 18, 2004.

(30) Foreign Application Priority Data

Oct. 20, 2003 (JP) ............................. 2003-359809
Oct. 24, 2003 (JP) ............................. 2003-364308
Apr. 20, 2004 (JP) ............................. 2004-123914

(51) Int. Cl.
B05D 3/00 (2006.01)
B05D 5/00 (2006.01)
B05D 3/06 (2006.01)

(52) U.S. Cl. .................. 427/201; 427/205; 427/372.2; 427/388.2

(58) Field of Classification Search .................. None
See application file for complete search history.

(56) References Cited

U.S. PATENT DOCUMENTS 5,163,602 A 11/1992 Usui
5,190,596 A * 3/1993 Timsit .......................... 148/23
5,677,008 A 10/1997 Kameya et al.
6,186,222 B1 * 2/2001 Doko et al. .................. 165/133

(Continued)

FOREIGN PATENT DOCUMENTS

CN 1244249 A 2/2000

(Continued)

OTHER PUBLICATIONS

Machine translation—JP 2003-251455 A, Tejima Kiyohide et al.,"Manufacturing Method of Braised Component for Aluminum Heat Exchanger", published Sep. 9, 2003.*

(Continued)

Primary Examiner—Marianne L Padgett
(74) Attorney, Agent, or Firm—Westerman, Hattori, Daniels & Adrian, LLP

(57) ABSTRACT

An coating apparatus, wherein the apparatus applies a coating, onto a surface of an aluminum alloy member for a heat exchanger to be assembled by brazing, with a top-feed-type roll transfer system having at least three rolls, the coating being obtained by mixing into an organic binder a metal powder, a flux powder, a powder mixture thereof, or a compound containing a metal component and a flux component, wherein rotation directions of transfer rolls of the apparatus arranged above a surface to be coated of an aluminum alloy extruded member that moves in a horizontal direction, satisfy a relationship in which a rotation direction of a coated-metal roll for coating, which rotates in a direction opposite to a moving direction of the extruded member, and a rotation direction of a metal roll for adjusting an adhesion amount of the coating by contacting with the above roll, are opposite to each other; and a method of producing an aluminum alloy heat exchanger member using the apparatus; and an aluminum alloy heat exchanger member.

2 Claims, 18 Drawing Sheets

U.S. PATENT DOCUMENTS

| | | | |
|---|---|---|---|
| 6,193,140 B1 | 2/2001 | Suzuki et al. | |
| 6,234,381 B1 * | 5/2001 | Hasegawa et al. | 228/223 |
| 6,344,237 B1 * | 2/2002 | Kilmer et al. | 427/190 |
| 6,428,851 B1 | 8/2002 | Friedersdorf et al. | |
| 6,562,407 B1 | 5/2003 | Bonnebat et al. | |
| 6,601,644 B2 * | 8/2003 | Ozaki et al. | 165/134.1 |
| 6,668,611 B2 * | 12/2003 | Kashiwazaki et al. | 72/269 |
| 6,800,345 B2 * | 10/2004 | Teshima et al. | 428/35.8 |
| 2002/0189318 A1 * | 12/2002 | Kashiwazaki et al. | 72/467 |
| 2003/0203137 A1 * | 10/2003 | Teshima et al. | 428/34.1 |

FOREIGN PATENT DOCUMENTS

| | | |
|---|---|---|
| DE | 19913111 A1 | 9/1999 |
| JP | 05-096230 | 4/1993 |
| JP | 07-303858 | 11/1995 |
| JP | 2681380 | 11/1997 |
| JP | 2681389 | 11/1997 |
| JP | 10-94871 A * | 4/1998 |
| JP | 10-193094 A | 7/1998 |
| JP | 11-152559 A | 6/1999 |
| JP | 11-192582 | 7/1999 |
| JP | 11-216592 | 8/1999 |
| JP | 11-239867 | 9/1999 |
| JP | 11-262710 A | 9/1999 |
| JP | 2000-274980 | 10/2000 |
| JP | 2000-317683 A | 11/2000 |
| JP | 2003-251455 | 9/2003 |
| WO | 2004/030831 A2 | 4/2004 |
| WO | WO 2005/037479 A1 * | 4/2005 |

OTHER PUBLICATIONS

Machine translation—JP 11-216592 A, Miyaji Haruhiko et al.,"Aluminum Material for Brazing, and Heat Exchanger Manufacturing Method", published Aug. 10, 1999.*

Machine translation—JP 2000-274980 A, Tejima Kiyohide et al.,"Heat Exchanger Made of Aluminum", published Oct. 6, 2000.*

Machine translation—JP 11-239867 A, Tejima Kiyohide et al.,"Aluminum Extruded Porous Flattened Tube for Heat Exchanger of Automobile Excellent in Property to be Braised and Manufacture thereof", published Sep. 7, 1999.*

Machine translation—JP 07-303858, Suzuki Toshihiro et al.,"Method for Applying Slurry for Brazing", published Jul. 21, 1995.*

International Search Report of International Application PCT/JP2004/015745 mailed Feb. 15, 2005.

Chinese Office Action dated Apr. 4, 2008, (mailing date) issued in corresponding Chinese Patent Application No. 2004-800363033.

European Search Report dated Oct. 6, 2008, issued in corresponding European Patent Application No. 04773815.8.

Extended European Search Report dated Oct. 19, 2009; issued in corresponding European Application No. 09009572.0.

* cited by examiner

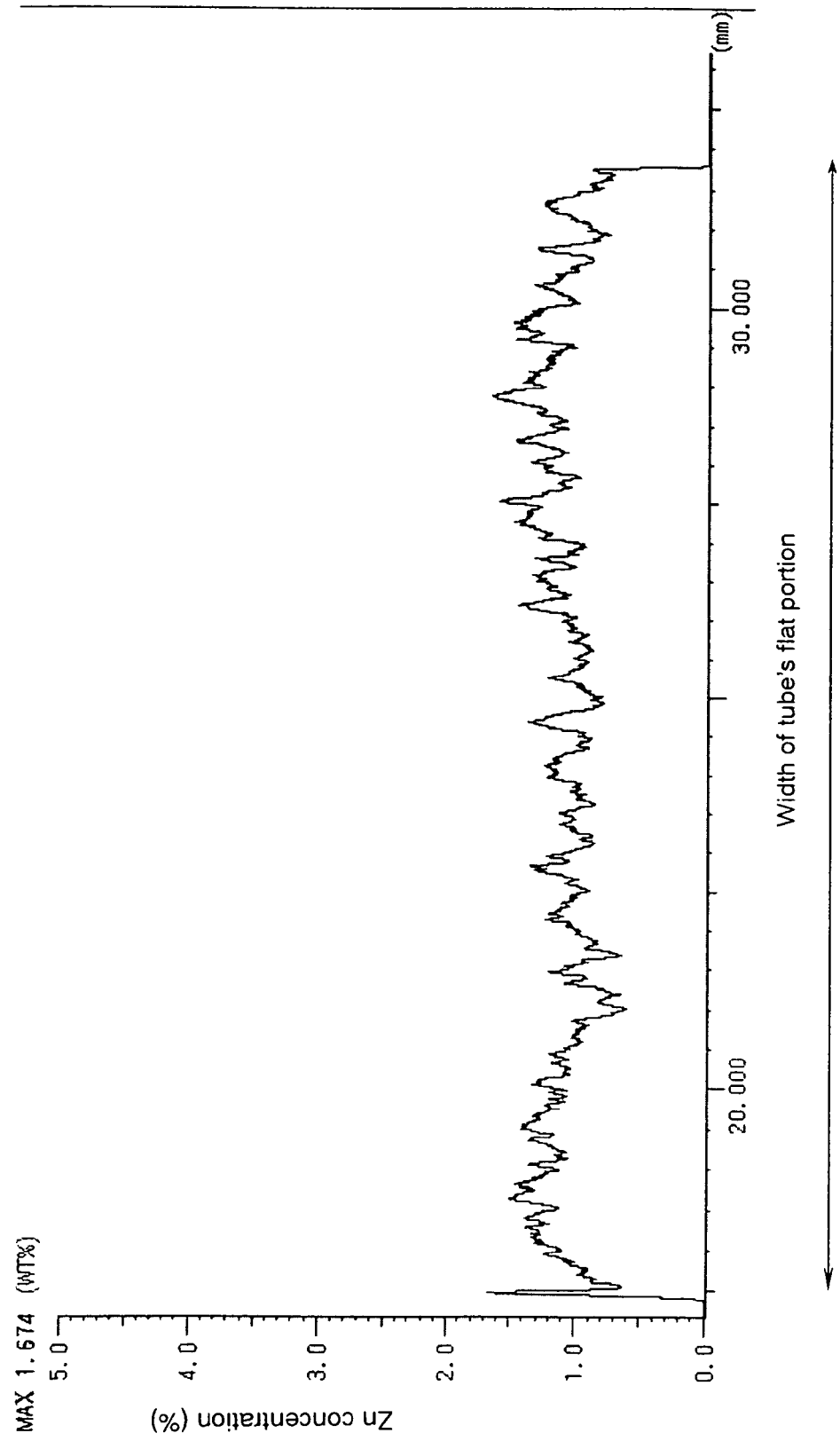

COATING APPARATUS FOR AN ALUMINUM ALLOY HEAT EXCHANGER MEMBER, METHOD OF PRODUCING A HEAT EXCHANGER MEMBER, AND ALUMINUM ALLOY HEAT EXCHANGER MEMBER

This application is a continuation of international application PCT/JP2004/015745 filed on Oct. 18, 2004.

TECHNICAL FIELD

The present invention relates to a method of producing an aluminum alloy member for a heat exchanger, which can be assembled by means of a brazing process. The present invention also relates to an apparatus using the above method. The present invention also relates to an aluminum alloy heat exchanger member, on which a filler material is applied with the above apparatus or method.

Further, the present invention relates to a material composed of an aluminum alloy, for example, an aluminum alloy flat multi-cavity tube coated with a coating containing metal powder for brazing an aluminum material, which is used for brazing the aluminum material. Further, more specifically, the present invention relates to a resin-coated aluminum alloy flat multi-cavity tube for a heat exchanger, which is coated with a coating containing metal powder suitable for brazing to be used in joint assembly of a heat exchanger or the like, e.g. an automotive aluminum alloy evaporator, condenser, or radiator; and to a method of producing the same.

BACKGROUND ART

Brazed aluminum alloy products, as represented by automotive heat exchangers, for obtaining well-brazed state, have required removal of oxide layers formed on their surfaces after extrusion or rolling process.

Examples of the process of removing the oxide layer include a process of removing the oxide layer by applying a chloride-based flux or a fluoride-based flux. Nowadays, a nitrogen-atmospheric (NB) brazing process using a fluoride-based flux, which does not require a washing step after brazing but leads to a lower apparatus cost, has become a mainstream in the art.

A usual process of applying the fluoride-based flux has been to apply a suspension of flux on a desired portion by means of spraying or the like, just before the brazing process after assembling members to be brazed. However, in this process, the adhesion of flux after applying is poor and thus the flux is flown by hot air that circulated in a furnace. Therefore, there is a risk of causing a problem in that the desired objective effect would not be exerted. Further, there are other problems in that floating of un-adhered flux causes at the time of applying the flux worsened working conditions and that the step of applying the flux results in an increase in production cost. Besides, since an automotive heat exchanger has a detailed complicated configuration, uniform coating of flux is very difficult. Therefore, there is a problem of inadequate brazing at a portion having an insufficient amount of flux applied, or there is a problem of spoiling the beauty of appearance with the residual flux which could not participate in a reaction at a portion having an excess amount of flux.

General methods of applying flux include a dipping method, a spray atomizing method (spraying method), a brush coating method, and a roll transfer method using a roll coater (JP-A-7-303858 ("JP-A" means unexamined published Japanese patent application)). Among them, with respect to the dipping method, it is very difficult to cope with the control of the thickness of a coated layer, especially the control of a thin film in micron order. If the precipitation property of the solid component in a coating is high, there is a problem in that a stable coated layer cannot be formed and the method is unsuitable to the formation of a coated layer at high speed (JP-A-10-94871). To that end, considering the productivity, the use of a spray method (JP-A-09-85483), a brush-coating method, or a roll transfer method as a coating method is being under study. However, the spray atomizing method may be adaptable for low-viscous coating but not suitable to high-viscous coating. Besides, there is a disadvantage in that problems such as variation in amount of the coating applied or the like tend to occur owing to a change in atomizing pattern caused by clogging a nozzle portion or generating hardened coating. In consideration of such a fact, in particular, the employment of a roll transfer method has been studied.

The roll transfer method selects a process of supplying a coating depending on the characteristics of the coating. That is, a bottom-up process in which a coating is swept up with a roll is generally selected when the coating contains a solute having a low sedimentation rate. Alternatively, for another kind of coating, such as a flux compound, in which the specific gravity of a solute is larger than that of a solvent (i.e., the solute in the coating has a high sedimentation rate), a top-feed method with which the sedimentation of the solute is prevented by supplying and circulating the coating between rolls is generally selected (JP-A-5-96230).

For the process of supplying a coating in the top-feed method, the supplying position is restricted by the number and arrangement of rolls. Further, the supplying position restricts the rotation direction of each roll. The uniformity of the coated layer after application of the coating is greatly influenced by the characteristics of the coating and the rotation direction of the roll. Therefore, those factors are important especially for designing a coating apparatus.

In recent years, attempts have been conducted to provide an aluminum alloy heat exchanger member with various functions. In one example, for the purpose of lowering the cost by bearing a fin material shaped by corrugating an aluminum alloy brazing sheet material, there is proposed a method of applying a coating on the surface of an aluminum alloy flat multi-cavity tube to be combined with the fin. In this case, the coating is prepared by mixing a filler alloy powder, as typified by an Al—Si alloy, and a flux powder, as typified by $K_3AlF_6$, in an organic binder (JP-A-11-239867). In another example, for obtaining an effect of improving corrosion resistance accompanying reductions in mass and thickness of an automotive heat exchanger, there is proposed a method of applying a coating, which is prepared by mixing into an organic binder a metal powder, as typified by Zn, having a sacrificial anode effect, or a flux compound, as typified by $KZnF_3$, provided as an alloy having such a sacrificial anode effect (JP-A-05-96230). In the later case, for example, in a flat multi-cavity tube (202), as illustrated in a cross sectional view in FIG. 29, even though application of the coating of a filler material or a sacrificial anode effect alloy to flat portion (202F) in contact with the fin material (e.g., 16 in FIG. 10) is clearly described, there is no clear description particularly with respect to the technology of applying the coating on curved portion (202R) not in contact with the fin material. However, the presence or absence of coated layers on the flat portion and the curved portion causes an electrochemically imbalanced condition. In particular, in the case of the application of the coating of a sacrificial anode effect alloy, as the sacrificial anode effect alloy does not exist on the curved portion, an electrical potential became electropositive as compared with that of the flat portion, and thus corrosion such as pitting corrosion occurred at an early stage, resulting in serious problems in the design of corrosion protection. On the other hand, in both of those two cases, as the coating contains dispersions of the metal powder and the flux compound each having a specific gravity larger than that of the organic binder, important subject matters to be solved are securing the stability of the coating at the time of coating with the roll transfer method and securing the uniformity of the coated layer.

For instance, an aluminum alloy member for an automotive heat exchanger, particularly a product like a flat multi-cavity tube is generally rolled in the shape of a coil in view of productivity. Thus, when coating such as a flux compound is applied on the surface of such a coil-shaped product, an important quality item is the dryness of the coating after application. If the dryness is insufficient, troubles in brazing and corrosion resistance may occur owing to a decrease in adhesion of the coating and peal of the coating at the time of assembly by brazing. A process of drying a coating applied by means of a roll transfer method usually used in the art is a hot air system or a far-infrared heater system. Since the hot air system brows hot air directly or indirectly to the surface of a product after application of the coating, vibration of the product may occur. As the vibration spreads in a roll transfer part, the mass of the coating adhered tends to vary, which is a defect. Further, if the speed of the product is high, there is a problem in that the length of a drying furnace should be extended because of insufficient drying capacity. The far-infrared heater system does not generate the vibration unlike the hot air system, but, similar to the hot air system, causes an insufficient drying capacity at high-speed coating.

On the other hand, a brazing joint of an aluminum heat exchanger for an automobile, such as a condenser, is generally carried out such that an aluminum-extruded flat multi-cavity tube and a brazing sheet prepared by cladding an Al—Si-based filler material on an aluminum material are assembled into a predetermined joint configuration and then heated at a brazing temperature.

In this case, for attaining a sufficient joint, it is necessary to destroy and remove a hard aluminum oxide on the surfaces of the filler material of the extruded flat multi-cavity tube and aluminum brazing sheet. In general, flux is suspended in water or an alcohol in advance, the resultant suspension is applied by spraying on the brazing joint surface, and then a solvent is vaporized, followed by brazing.

In recent years, in view of dispensing with the flux coating work just before brazing, methods (pre-coating) of applying, in advance, a flux composition or a mixture composition of flux with a filler material on the surface of a material to be brazed, and brazing compositions for pre-coating have been proposed in JP-A-3-35870, JP-A-6-285681, JP-A-6-504485, Japanese Patent No. 2681380, Japanese Patent No. 2681389, and the like.

Further, these pre-coating methods include coating methods such as a spray method, a dipping method, and a roll transfer method. In these methods, compositions having a certain composition ratio tend to find difficulty in high speed coating because of precipitation of metal powder. For uniformly pre-coating a flux composition or a mixture composition of a flux and a filler material successively at high speed with good transferring property and adhesion by the roll transfer method, JP-A-11-239867 proposes: a brazing composition in which the type of a synthetic resin in the composition and/or a mass ratio between the flux or filler material and the synthetic resin in the composition are specified; and a production method in which the properties of an organic solvent and the viscosity of the coating are specified.

However, when the brazing composition having such a coating composition and coating property is applied by a usual roll transfer method, it cannot be uniformly pre-coated at high speed in a continuous fashion with good transferring property and adhesion. Thus, a resin-coated aluminum flat multi-cavity tube that is coated with a composition having a certain composition ratio in a stable manner cannot be obtained.

Other and further features and advantages of the invention will appear more fully from the following description, taken in connection with the accompanying drawings.

BRIEF DESCRIPTION OF DRAWINGS

FIGS. 11(a) and 11(b) are diagram to show patterns of passing or not passing the test with respect to Zn concentration after brazing, respectively.

Herein, the identical reference numerals in the drawings refer to the same components or members.

DISCLOSURE OF THE INVENTION

Figure 1:
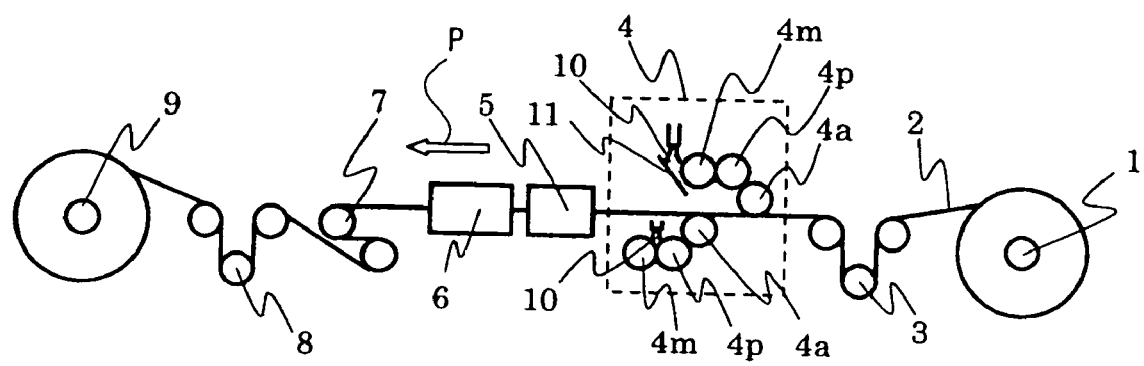
FIG. 1 is a schematic view for illustrating an example of a configuration of the apparatus of the present invention for producing an aluminum alloy automotive heat exchanger member of flux-coating type.

According to the present invention, there are provided the following means:

(1) An apparatus for coating an aluminum alloy heat exchanger member for brazing, wherein said apparatus applies a coating, onto a surface of an aluminum alloy member for a heat exchanger to be assembled by a brazing process, with a top-feed-type roll transfer system having at least three rolls, said coating being obtained by mixing into an organic binder a metal powder, a flux powder, a powder mixture of a metal powder and a flux powder, or a compound containing a metal component and a flux component, wherein rotation directions of transfer rolls of said coating apparatus arranged above a surface to be coated of an aluminum alloy extruded member that moves in a horizontal direction, satisfy a relationship in which a rotation direction of a coated metal roll for coating, which rotates in a direction opposite to a moving direction of the aluminum alloy extruded member, and a rotation direction of a metal roll for adjusting an adhesion amount of the coating by contacting with the coated-metal roll for coating, are opposite to each other.

(2) The apparatus for surface-coating an aluminum alloy heat exchanger member for brazing described in item (1), wherein an electromagnetic induction heating device is used for drying the coating applied on the surface of the aluminum alloy extruded member.

(3) The apparatus for surface-coating an aluminum alloy heat exchanger member described in item (1) or (2), wherein the coating to be applied on the surface of the aluminum alloy heat exchanger member contains at least one of a Si simple substance or Al—Si-based alloy powder having a brazing effect, and a powder of a Zn simple substance or Al—Zn-based alloy having a sacrificial anode effect, or a mixture of the metal powder and the flux powder or a compound powder of the metal and the flux.

(4) A method of producing an aluminum alloy heat exchanger member for brazing, comprising:

applying a coating onto a surface of an aluminum alloy member for a heat exchanger to be assembled by a brazing process, with a top-feed-type roll transfer system having at least three rolls, said coating being prepared by mixing and stirring a flux component containing a metal powder in a flux powder, or a flux component containing a metal compound powder in a flux powder, into an organic binder, wherein rotation directions of transfer rolls of a coating apparatus arranged above a surface to be coated of an aluminum alloy extruded member that moves in a horizontal direction, satisfy a relationship in which a rotation direction of a coated metal roll for coating, which rotates in a direction opposite to a moving direction of the aluminum alloy extruded member, and a rotation direction of a metal roll for adjusting an adhesion amount of the coating by contacting with the coated metal roll for coating, are opposite to each other.

(5) The producing method described in item (4), wherein the coating applied on the surface of the aluminum alloy extruded member is dried by means of an electromagnetic induction heating method.

(6) The method of producing an aluminum alloy automotive heat exchanger member described in item (4) or (5), wherein the coating to be applied on the surface of the aluminum alloy heat exchanger member, contains at least one of powders of a metal substrate or alloy having a brazing effect or a metal substrate or alloy having a sacrificial anode effect, or a mixture of the metal powder and the flux powder, or a compound powder of the metal and the flux.

(7) An aluminum alloy heat exchanger member, which is obtained by the method described in item (4), (5), or (6).

(Hereinafter, the apparatuses for coating an aluminum alloy heat exchanger member for brazing, as described in the above items (1) to (3), the methods of producing an aluminum alloy heat exchanger member for brazing, as described in the above items (4) to (6), and the aluminum alloy heat exchanger member described in the above item (7), are collectively referred to as the first embodiment of the present invention.)

(8) A resin-coated aluminum alloy flat multi-cavity tube for a heat exchanger, comprising:

an aluminum alloy flat multi-cavity tube in which at least one flat surface thereof is adjusted to have a surface roughness of a center line average roughness (Ra) of 0.4 μm or more, and a ten-point height of irregularities (Rz, ten-point average roughness) of 3 μm or more, wherein said roughened surface is coated and cured with a resin coating containing a metal powder for brazing that contains the metal powder containing a brazing flux, an acrylic resin, and a cross-linking agent and that has a metal powder volume content in solid content (volume % of the metal powder in a total amount (solid content) of the metal powder, the acrylic resin, and the cross-linking agent) of 50% to 90%.

(9) The resin-coated aluminum alloy flat multi-cavity tube for a heat exchanger as described in item (8), wherein the metal powder further contains a filler material.

(10) The resin-coated aluminum alloy flat multi-cavity tube for a heat exchanger as described in item (8) or (9), wherein the roughened surface of the aluminum alloy flat multi-cavity tube is coated with the resin containing the powder for brazing in an amount of 3 to 30 g/m² as a mass of adhesion (deposition) per unit area after drying.

(11) A method of producing the resin-coated aluminum alloy flat multi-cavity tube for a heat exchanger described in item (8) or (9), comprising:
supplying, by a top-feed system, the coating of the resin containing a metal powder for brazing, that is prepared as a coating by using water and an organic solvent;
applying the coating by a reverse system; and
drying.

(12) The method of producing the resin-coated aluminum alloy flat multi-cavity tube for a heat exchanger as described in item (11), wherein the metal powder has an average particle diameter of 30 µm or less and a density of 4.0 Mg/m³ or less.

(Hereinafter, the resin-coated aluminum alloy flat multi-cavity tubes for a heat exchanger, as described in the above items (8) to (10), and the methods of producing a resin-coated aluminum alloy flat multi-cavity tube for a heat exchanger, as described in the above items (11) to (12), are collectively referred to as the second embodiment of the present invention.)

(13) An aluminum alloy member for a heat exchanger to be assembled by a brazing process, having:
a coating layer, which contains a flux powder substance or a metal powder substance, a powder mixture of a flux powder and a metal powder, or a compound powder containing a flux component and a metal component, and which is formed on a flat portion of said member contacting an aluminum alloy fin material, and a peripheral surface of a curved portion interposed between the flat portions of said member.

(14) The aluminum alloy heat exchanger member as described in item (13), wherein the coating layer contains at least one of a flux powder substance or a metal powder (e.g., an Si simple substance or an Al—Si-based alloy) having a brazing effect, or a metal powder (e.g., a Zn simple substance or an Al—Zn-based alloy) having a sacrificial anode effect, or a mixture of the metal powder and the flux powder or a compound powder containing the metal component and the flux component.

(15) The aluminum alloy heat exchanger member as described in item (13), wherein the flat portion has the coating layer that contains a powder of a flux substance, a metal powder (e.g., an Si simple substance or an Al—Si-based alloy) having a brazing effect, a metal powder (e.g., a Zn simple substance or an Al—Zn-based alloy) having a sacrificial anode effect, or a mixture of the metal powder and the flux powder or a compound powder having the metal component and the flux component, and wherein the curved portion has the coating layer that contains a metal powder (e.g., a Zn simple substance or an Al—Zn-based alloy) having a sacrificial anode effect, or a mixture of the metal powder and the flux powder or a compound powder containing the metal component and the flux component.

(16) The aluminum alloy heat exchanger member as described in item (13), wherein a deposition amount of the powder is set such that: the flux powder substance has a flux component mass of 3 g/m² to 12 g/m²; and the mixture powder of the metal powder substance and the flux powder substance or the compound powder containing the metal component and the flux component has a flux component in an amount of 55 to 75% by mass, a metal component in an amount of 25 to 45% by mass, and a total mass of the flux component and the metal component of 5 g/m² to 18 g/m².

(17) The aluminum alloy heat exchanger member as described in item (13), wherein the powder has an average particle diameter of 1 to 30 µm, and particles having a particle diameter of 50 µm or less account for 75% or more of the whole particles in mass ratio.

(18) A method of producing an aluminum alloy heat exchanger member, comprising:
coating a surface of an aluminum alloy member for a heat exchanger that is assembled by a brazing process, with a coating which is prepared by mixing and stirring a flux powder substance or a metal powder substance, a powder mixture of the flux powder and the metal powder, or a compound powder containing a flux component and a metal component, in an organic binder, wherein a roll transfer method is used for coating a flat portion of said member in contact with an aluminum alloy fin material, and one of a roll transfer method, a spray method and a brush-coating method or a combination of two or more of the methods is used for coating a curved portion interposed between the flat portions of said member, thereby forming a coating layer on a peripheral surface to impart brazing property and corrosion resistance.

(19) The method of producing an aluminum alloy heat exchanger member as described in item (18), wherein the coating contains at least one of a flux powder substance or a metal powder (e.g., an Si simple substance or an Al—Si-based alloy) having a brazing effect, or a metal powder (e.g., a Zn simple substance or an Al—Zn-based alloy) having a sacrificial anode effect, or a mixture of the metal powder and the flux powder or a compound powder containing the metal component and the flux component.

(20) The method of producing an aluminum alloy heat exchanger member as described in item (18), wherein the flat portion is coated with the coating that contains a powder of a flux substance, a metal powder (e.g., an Si simple substance or an Al—Si-based alloy) having a brazing effect, or a metal powder (e.g., a Zn simple substance or an Al—Zn-based alloy) having a sacrificial anode effect, or a mixture of the metal powder and the flux powder, or a compound powder containing the metal component and the flux component; and the curved portion is coated with the coating that contains a metal powder (e.g., a Zn simple substance or an Al—Zn-based alloy) having a sacrificial anode effect, or a mixture of the metal powder and the flux powder or a compound powder containing the metal component and the flux component.

(21) The method of producing an aluminum alloy heat exchanger member as described in item (18), wherein an adhesion amount in the coating layer is set such that: the flux powder substance has a flux component mass of 3 g/m² to 12 g/m²; and the mixture powder of the metal powder substance and the flux powder substance or the compound powder containing the metal component and the flux component has a flux component in an amount of 55 to 75% by mass, a metal component in an amount of 25 to 45% by mass, and a total mass of the flux component and the metal component of 5 g/m² to 18 g/m².

(22) The method of producing an aluminum alloy heat exchanger member as described in item (18), wherein the powder in the coating has an average particle diameter of 1 to 30 μm, and particles having a particle diameter of 50 μm or less account for 75% or more of the whole particles in mass ratio.

(Hereinafter, the aluminum alloy heat exchanger members, as described in the above items (13) to (17), and the methods of producing an aluminum alloy heat exchanger member, as described in the above items (18) to (22), are collectively referred to as the third embodiment of the present invention.)

Herein, the present invention means to include all the above first, second and third embodiments, unless otherwise specified.

BEST MODE FOR CARRYING OUT THE INVENTION

The present invention is described in detail below.

The inventors of the present invention have conducted experiments of applying a flux compound on the surface of an aluminum alloy material by means of a roll transfer method. Then, the evaluation was carried out with respect to the stability and adhesion of the coated surface and the characteristics of the product after coating. As a result, we have found that the rotation systems and drying systems of the respective rolls in a roll transfer device impart a great influence on the uniformity and adhesion of the coated layer after coating. Further, the inventors have conducted experiments that the aluminum alloy material surface was positively coated with a flux component not only the flat portions but also the curved portion. As a result of evaluation on the above characteristics, we have found that the characteristics of a product after braze-heating are especially largely influenced, by coating of a flux compound on the peripheral surface of the product including the curved portion.

Further, the inventors have intentionally studied to carry out pre-application of a coating that contains a metal powder such as a filler material and brazing flux, on the surface of an aluminum-extruded flat multi-cavity tube to be used in an aluminum heat exchanger for an automobile, such as a condenser, at high speed by a roll transfer method in a continuous fashion, with good uniformity and adhesion. As a result, the inventors have found those useful that a specific composition be used as a coating, that the average particle diameter and density of the metal powder in the composition be controlled, further that the surface roughness of the aluminum flat multi-cavity tube be controlled, and that a specific roll-coater coating method be utilized.

The present invention has completed on the basis of the above findings.

The apparatus of the present invention, preferably the first embodiment, for coating an aluminum alloy heat exchanger member is preferably constructed such that a metal and/or flux compound powder mixed and stirred with an organic binder is applied on at least one surface of said aluminum material by means of a roll transfer method typified by a roll coater; and then a volatile solvent portion in the coating is vaporized preferably with an induction heating-type drying furnace, to fix the coating on the aluminum material.

The aluminum alloy heat exchanger member to be coated may be an extruded material typified by a flat multi-cavity tube, or a rolled material typified by a header plate, as far as it is designed to wind into a coil shape. As the above extruded material, in addition to an extruded material obtained by a usual extrusion method, an extruded material (e.g. a flat multi-cavity tube) obtained by a conform extrusion method may be used. Examples of the conform extrusion method include those described in U.S. Pat. No. 5,567,493, JP-A-8-187509, and the like. The descriptions of the above patent publications are herein incorporated by reference.

The organic binder, which is to be mixed with a flux powder component that can be used in the present invention, is preferably one having a composition that a solvent component in the binder is vaporized at approximately 120° C. to 200° C. in the process of coating, and a resin component in the binder is vaporized under brazing temperature conditions in the subsequent brazing process, while a carbonaceous residue be not left on the surface of an aluminum material. For example, but not specifically limited to, examples of such an organic binder include an acrylic resin or the like. The above is due to such problems that apparatus costs increases, that the length of a coating line has to be extended, or the like, when a drying temperature over 200° C. is required for drying in coating. It is preferable that the coating is completely dried at 120° C. to 150° C.

The coating containing a metal powder for brazing that can be used in the present invention, preferably in the second embodiment, is preferably those contain a metal powder containing a brazing flux alone or the flux in combination with a filler material; an acrylic resin as a binder; a cross-linking agent; and in addition, water and an organic solvent (e.g. a high-boiling-point alcohol, such as 3-methoxy-3-methyl-1-butanol, 3-methoxy-1-butanol, or the like). The metal powder, the acrylic resin as the binder, and the cross-linking agent are made into a coating by means of water and the organic solvent. In a brazing metal powder-containing resin (the total amount of the brazing metal powder, the acrylic resin, and the cross-linking agent), the content of the acrylic resin is preferably 10 to 20% by mass, and the content of the cross-linking agent is preferably 0.3 to 2% by mass. The amounts of water and organic solvent for making a coating are not particularly limited, but they are preferably 100 to 200% by mass to the solid content.

As a filler material (a filler alloy), a metal that forms an eutectic alloy with aluminum at brazing, such as Si, Zn, Cu, or Ge, can be used. Further, any alloy of any of these metals, which form eutectic alloys with aluminum at brazing, and aluminum, may also be used. One or more of these metals and alloys can be adapted as the filler material.

As a binder resin, one containing an acrylic resin and a cross-linking agent can be used. The acrylic resin may be a macromolecular polymer, such as polymethacrylic ester. The cross-linking agent may be block isocyanate, an oxazoline group-containing polymer, or the like. These binders are vaporized at brazing temperatures.

The flux for use in the present invention is required for reducing and removing a hard aluminum oxide layer existing on the surface of an aluminum member. Examples of the flux that can be used, include a fluoride-based flux, such as KF, $AlF_3$, $KAlF_4$, $KAlF_5$, $K_2AlF_5$, $K_3AlF_5$, CsF, RbF, LiF, NaF, $CaF_2$, and $KZnF_3$; or other flux containing any of these compounds as its main component. Herein, the term "its main component" means that said component is contained in the whole flux in an amount of generally 80% by mass or more, preferably 90% by mass or more (maximum 100% by mass).

The flux component to be mixed in the binder can contain, together with the flux powder, a Zn powder or a Zn-based alloy powder in a sacrificial anode effect composition, or an Si powder or an Al—Si-based alloy powder in a brazing effect composition. Regarding the sacrificial anode effect composition, a metal element, such as Sn or In, may be used, as far as it is electrochemically a basic metal, compared with aluminum. In the oxide layer-removing effect composition, it is preferably a compound containing F and/or K.

In this embodiment, in the total amount of the metal component (metal powder) and the flux component in the coating, the amount of the metal component is preferably 25 to 45% by mass, more preferably 30 to 40% by mass, and the amount of the flux component is preferably 55 to 75% by mass, more preferably 60 to 70% by mass. If the amount of the metal component is too small, a trouble in brazing or corrosion resistance deterioration is caused, due to an insufficient absolute amount of the filler material or sacrificial corrosion preventive material. On the other hand, if the amount of the metal component is too much, a trouble in brazing occurs, due to an insufficient absolute amount of flux (insufficient ability to remove the oxide layer). When the deposition amount is increased for preventing these troubles, the thickness of the coating layer increases and a trouble such as a failure of joint between a tube and a fin material (i.e. core breakage) occurs. Further, the mass ratio of the organic binder in the coating is preferably 0.15 to 0.45, assuming that the flux component be 1. In the case of the coating, 50 to 70% by mass of water and/or an organic solvent (e.g. a high-boiling-point alcohol, such as 3-methoxy-3-methyl-1-butanol, 3-methoxy-1-butanol, or the like) can be contained in the coating. Alternately, in another embodiment of the present invention, the mass ratio of the organic binder in the coating may be set to preferably 1.3 to 1.5, assuming that the flux component be 1; and in the case of the coating, 5 to 20% by mass of water and/or the above organic solvent may be contained in the coating.

The deposition amount of the flux component (including the filler material or the metal powder) is preferably 5 to 18 $g/m^2$, more preferably 5 to 15 $g/m^2$, further preferably 8 to 13 $g/m^2$, especially preferably 7 to 11 $g/m^2$, in terms of an amount after drying. The average particle diameter of the flux component is preferably 1 to 30 $g/m^2$; and it is preferable that particles having an average particle diameter of 50 μm or less account for 75% or more of the whole particles in mass ratio. If the average particle diameter is too small, the surface area of the flux to the flux volume becomes too large. Thus, such problems that an increase in binder ratio required for the adhesion of flux (costs up of the raw materials for the coating) and that the oxidation of the surface of flux may be caused in some cases, to thereby fail to exhibit sufficient effects of the brazing characteristics and the sacrificial corrosion resistance characteristics. On the other hand, if the average particle diameter is too large, since the flux component in the coating precipitates more quickly, the stability of the resultant coating is apt to deteriorate and the uniform coating may become difficult to be carried out. In addition, as the thickness of the coated layer increases, the risk of causing a trouble of core breakage becomes higher. It is preferable that the average particle diameter is preferably 1 to 20 mm, and that particles having an average particle diameter of 35 μm or less account for 75% or more of the whole particles in mass ratio.

For each roll of the roll transfer device for applying a coating on the flat portion of an aluminum alloy heat exchanger member, a coating material for a coated roll for coating (hereinafter, referred to an applicator roll) is not particularly limited to a certain material, as far as the composition thereof enables transfer to the surface of the aluminum alloy heat exchanger member. Materials for metal rolls (e.g., pickup roll or metering roll) for adjusting the deposition amount of the coating other than the applicator roll, are not particularly limited to a certain material. For controlling the deposition amount, it is preferable to conduct smoothing treatment such as metal plating.

With regard to the rotation direction of the roll transfer apparatus, in order to enhance the uniformity of the coated surface, an applicator roll is preferably revolved in the direction opposite to the direction of transferring an aluminum alloy heat exchanger member. The number of rolls is preferably three (i.e., an applicator roll, a pickup roll, and a metering roll), in relation to the control of formation a coated layer and the apparatus costs. If there are two rolls, the cost of the apparatus can be low but it is difficult to control the formation of a coated layer. If there are four rolls or more rolls, on the other hand, the formation of a coated layer can be controlled excellently but the cost of the apparatus increases.

Herein, an important factor that exerts an influence on the quality of a coated layer is the relationship between the rotation direction of an applicator roll and the rotation direction of a pickup roll adjacent to the applicator roll. In the case of a transfer apparatus having three rolls, a metering roll and a pickup roll are involved in first control of a coating. As both rolls are metallic rolls, the amount of the coating applied may be controlled, by making a gap of several tens to hundreds micrometers between them. The presence of the gap prevents the coating from receiving a sufficient shear force, which results that the thickness of the coating on the surface of the pickup roll will distribute non-uniformly. In the case of the conventional roll transfer apparatus, with regard to the rotation directions of the rolls applying an upper surface, both the pickup roll and the applicator roll rotate in the forward direction. Therefore, the non-uniform distribution of the coating on the surface of the pickup roll is directly transferred to the applicator roll and then transferred to the surface of the product, which results that the coated layer on the surface of the product be non-uniform. In contrast, in the present invention, preferably in the first embodiment, the pickup roll and the applicator roll are designed to rotate in the opposite rotation directions each other, to avoid the non-uniform coated layer on the surface of the product in the conventional method. This system intends to provide a uniform coated layer applied on the surface of a product, by bringing a non-uniform coating on the surface of a pickup roll into contact with the resin surface of an applicator roll being rotated in the direction opposite to the rotation direction of the pickup roll, thereby to give a sufficient shear force on the surface of the coating to make the coating state uniform, which can be transferred to the surface of the applicator roll. Therefore, it is preferable to rotate the applicator roll and the metering roll in the direction opposite to the rotation direction of the pickup roll.

In the present invention, after application of the coating by the above method, the coating is dried in a usual manner. Preferably, the drying is performed at a maximum temperature (PMT) of 100 to 200° C. reached by the flat multi-cavity tube or the like at the time of passing through a dryer. In the present invention, preferably the drying is carried out by an electromagnetic induction heating method. A heat-drying furnace is not particularly limited with respect to its output, configuration, or the like, as far as the furnace is of an electromagnetic induction heating type and is capable of drying a coating applied on the surface of an aluminum alloy heat exchanger member.

Hereinafter, the present invention, preferably the first embodiment, will be described, preferring to some preferable examples illustrated in the drawings.

Figure 2:
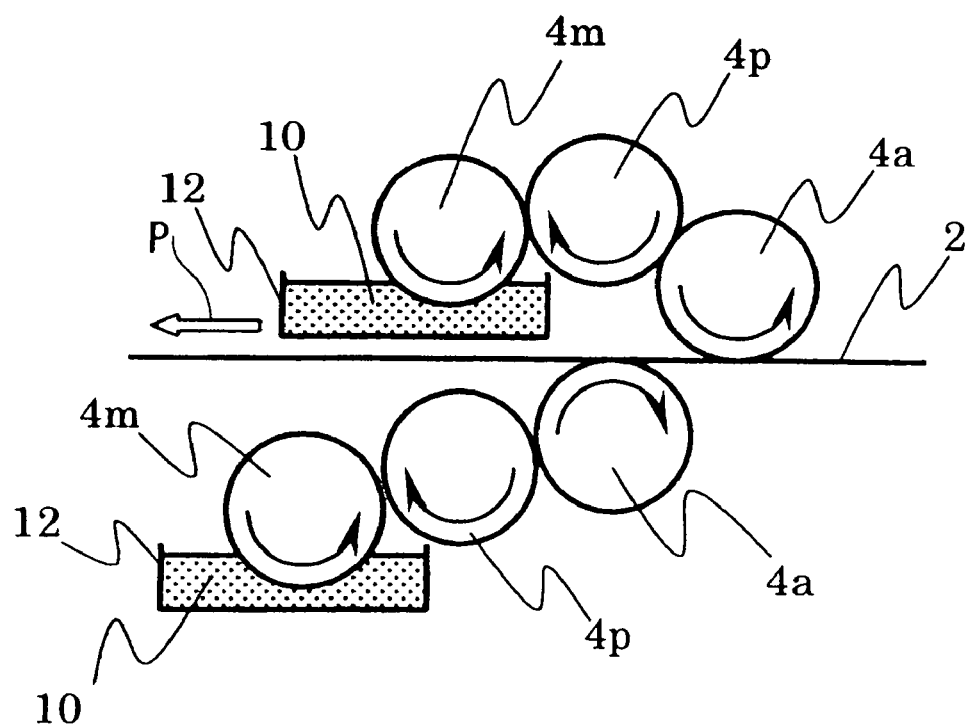
FIG. 2 is a diagram showing a roll transfer mechanism of a bottom up system.
Figure 3:
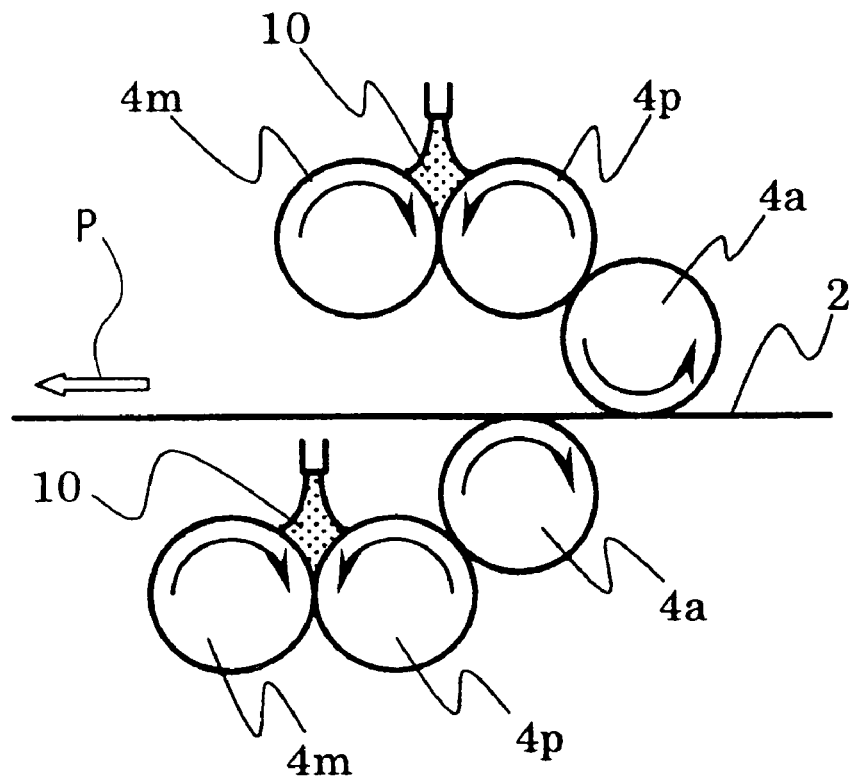
FIG. 3 is a diagram showing a roll transfer mechanism of a conventional top-feed system C.

With respect to the overall configuration of the coating apparatus, in a production line as shown in FIG. 1, an aluminum alloy member (e.g. a flat multi-cavity tube) 2 is unwound from an uncoiler 1 and then supplied to a roll coater 4 via passing through a tension roll 3. In the roll coater 4, the amount of a coating to be supplied to an applicator roll 4a is adjusted with a metering roll 4m and a pickup roll 4p. Subsequently, the final thickness of the resultant coated layer is adjusted with the pickup roll 4p and the applicator roll 4a, followed by application of the coating on the surface of the aluminum alloy member 2. As described above, the rotation directions of the respective rolls in this process are preferably designed such that the rotation direction of the applicator roll 4a is opposite to a direction P of moving the aluminum alloy member 2, the rotation direction of the pickup roll 4a is opposite to the rotation direction of the applicator roll 4a, and the rotation direction of the metering roll 4m is opposite to the rotation direction of the pickup roll 4p, respectively. The reason of allowing the applicator roll 4a and the pickup roll 4p to rotate oppositely in their directions is as follows. If these two rolls rotate in the same rotation direction, the coated layer pattern on the surface of the pickup roll 4p is directly transferred to the surface of the aluminum alloy member 2, and the uneven coating occurs in the longitudinal direction in coating. On the other hand, if these two rolls rotate in the opposite rotation directions, the coated layer pattern on the surface of the pickup roll 4p is pressed flat by contacting with the applicator roll 4a, resulting in a flat and smooth coating surface. When the coating as in the present invention contains a solute (flux component) having a high sedimentation speed, a top-feed system as shown in FIG. 3 is generally used, as a method of supplying a coating 10. This is because a bottom-up system with which the coating 10 is reserved in a coater pan 12 and the coating is swept upward, as shown in FIG. 2, has a problem in stability of a coated layer due to the separation of a flux compound. Herein, the arrows illustrated in the respective rolls indicate rotation directions.

Figure 4:
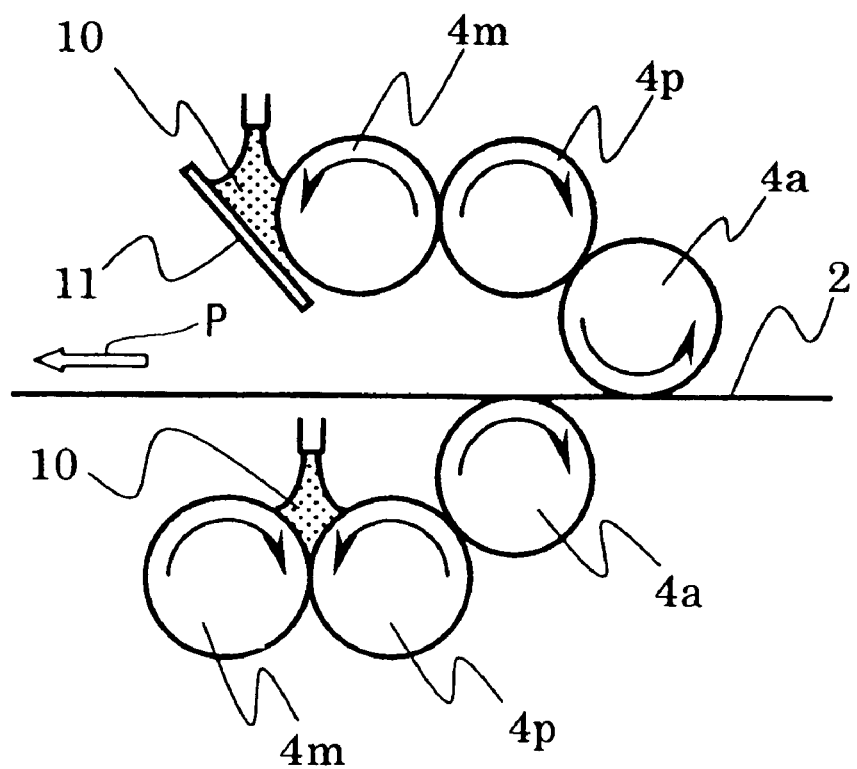
FIG. 4 is a diagram showing a roll transfer mechanism of a top-feed system A according to the present invention.
Figure 5:
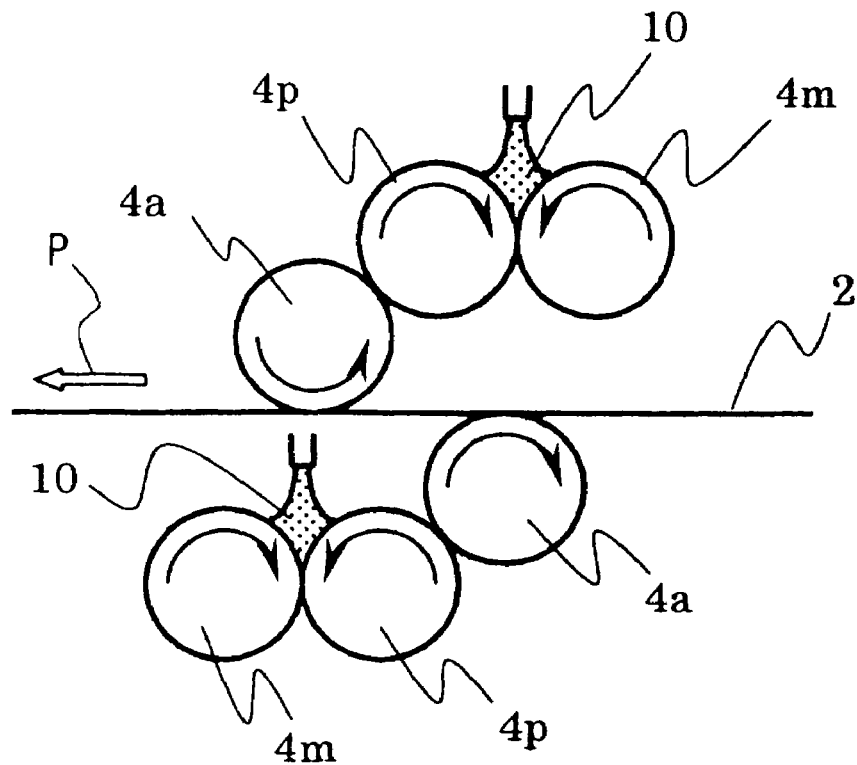
FIG. 5 is a diagram showing a roll transfer mechanism of a top-feed system B according to the present invention.

However, in the usual roll arrangements, the relationship between the rotations of the respective rolls described above cannot be obtained, in the case of coating on the upper surface of a product. Thus, a very useful arrangement of rolls is of a roll transfer system A in which a coating-retaining member 11 for retaining the coating 10 for the metering roll 4m, as shown in FIG. 4; or a roll transfer system B in which rolls are arranged, as shown in FIG. 5. The configuration of the coating-retaining member 11 of the roll transfer system A is not particularly limited, as far as the coating 10 can be retained therein. If four or more rolls are arranged, not specifically shown, the respective rolls are rotated such that an applicator roll for forming a coated layer on a product rotates in the direction opposite to that of a pickup roll adjacent to the applicator roll; and also means for supplying the coating is arranged such that formation of the coated layer can be controlled.

Figure 6:
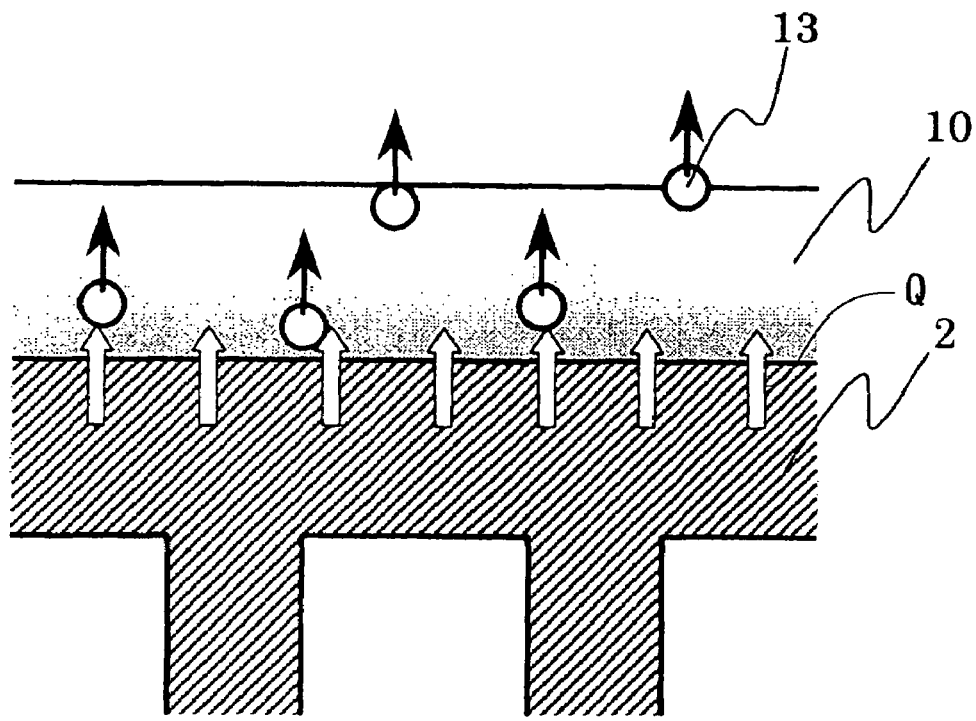
FIG. 6 is a cross-sectional diagram showing a material after coating in a dry state with an induction heat system.

In the present invention, preferably in the first embodiment, as shown in FIG. 1, after coating, heat drying is performed with a heating furnace 5, for example, an electromagnetic induction-type, at 120 to 200° C. In the case of the electromagnetic induction heating furnace 5, heating is performed from the inside of the aluminum alloy member 2 instantaneously and strongly. The heated aluminum alloy member 2 is coated with the coating 10, so that it will retain heat and the heat obtained by electromagnetic induction will effectively act for a long period of time. Further, the heat is conducted from the surface of the coated aluminum alloy member 2 to the coating 10, so that the solidification will proceed from the surface side of the aluminum alloy member 2 to the surface of the coating 10. Consequently, as shown in FIG. 6, air bubbles 13 generated by vaporization of volatile substances in the coating 10 move from the surface side of the aluminum alloy member 2 to the surface of the coating 10 and are released from the surface of the coating 10 to the atmosphere. As a result, the accumulation of the air bubbles 13 in the coated layer is prevented.

Figure 7:
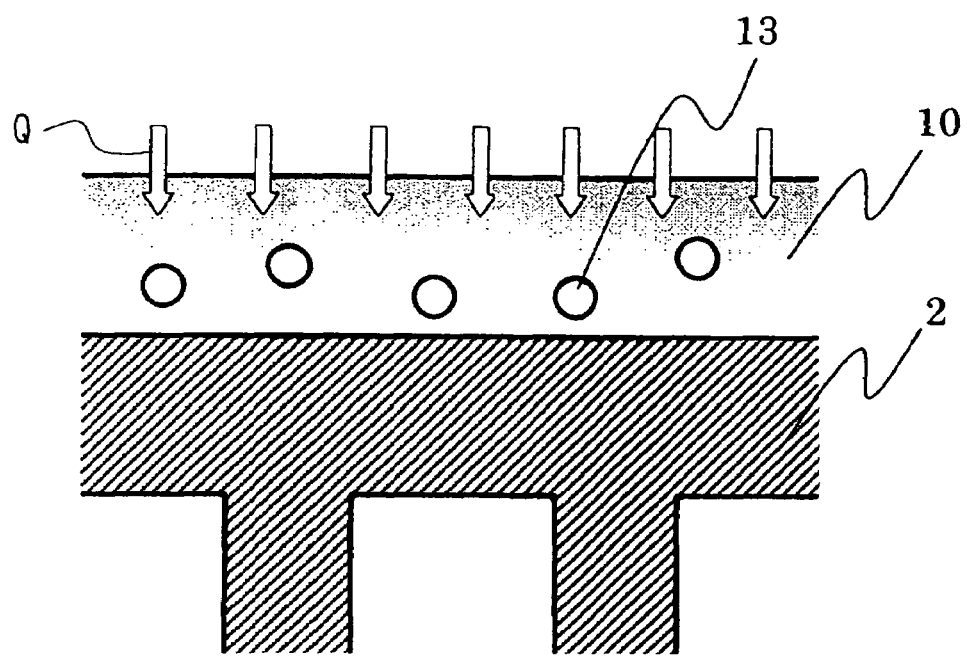
FIG. 7 is a cross-sectional diagram showing a material after coating in a dry state with a hot air or far-infrared heater system.

In contrast, in the case of heating with a hot air furnace 14, a far-infrared heater furnace 15, or the like, the heat is transmitted from the surface of the coating. Thus, the solidification progresses from the surface of the coating 10 to the surface side of the aluminum alloy member 2. Consequently, as shown in FIG. 7, the surface of the coating 10 is solidified at first, and thus the air bubbles 13 generated by vaporization of a volatile substances in the coating 10 are trapped and accumulated in the coated layer. Therefore, if a brazing process is carried out while the air bubbles 13 are accumulated, there are risks of causing brazing failure and a defect in outer appearance resulting from the air bubbles 13. Solid arrows in FIGS. 6 and 7 indicate the direction along which the air bubbles move, and outline arrows (Q) indicate the direction of heat transfer, respectively.

Figure 8:
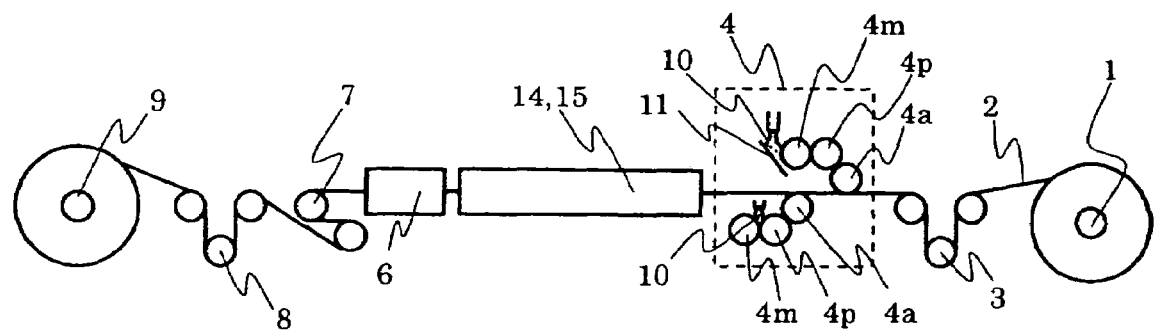
FIG. 8 is a diagram of a configuration of an apparatus based on a hot air or far-infrared heater system.
Figure 9:
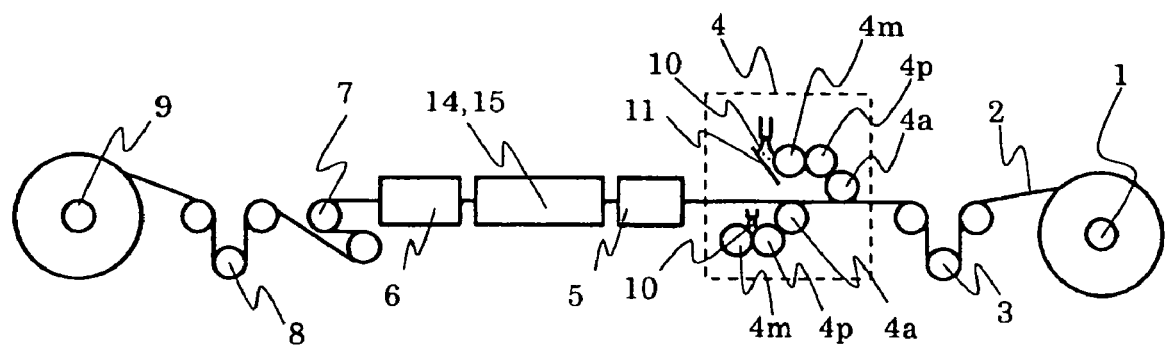
FIG. 9 is a diagram of a configuration of an apparatus in which an induction heat system is combined with a hot air or far-infrared heater system as supplementary heating.

Further, in the case of heating with the hot air furnace 14, the far-infrared heater furnace 15, or the like, there is almost no direct heat transmission to the aluminum alloy member 2. Thus, the heat of the coating 10 heated is unwillingly absorbed in the aluminum alloy member 2. Further, the thermal capacity of the aluminum alloy member 2 is much larger than that of the coating 10, so effective heating will be inhibited. Therefore, comparing with the case of the electromagnetic induction heating furnace 5 in FIG. 1, as shown in FIG. 8, there is a need of an apparatus having a very long furnace length and electric powers will be wasted. As shown in FIG. 9, it is advantageous to use the hot air furnace 14 or the far-infrared heater furnace 15, as a heat-insulating device after the electromagnetic induction heater furnace 5.

The aluminum alloy member 2 after drying by heating is cooled down to a given temperature in a cooling device 6, and then the cooled aluminum alloy member 2 passes through a driving device 7 and a tension roll 8, followed by rewinding around a recoiler 9. FIG. 1 illustrates an apparatus for double-side coating. However, one-side- or multiple-side-coating may also be conducted.

The production of the resin-coated aluminum flat multi-cavity tube in the present invention, preferably in the second embodiment, is preferably carried out such that the surface roughness of at least one flat surface of an aluminum flat multi-cavity tube is adjusted and the resultant surface whose surface roughness is adjusted (a roughened surface) is then roll-coated, preferably by means of a three-roll system, with a metal powder-containing-coating that contains a brazing flux alone or the flux in combination with a filler material, followed by drying the coated surface.

Regarding the surface roughness of the flat surface of an aluminum flat multi-cavity tube, a center line average roughness (Ra) is generally set to be 0.4 μm or more and a ten-point height of irregularities (Rz) is generally set to be 3.0 μm or more. Further, it is preferable that the center line average roughness (Ra) is 0.6 μm or more and the ten-point height of irregularities (Rz) is 4.0 μm or more. If Ra is too small or Rz is too small, the surface roughness is insufficient and an anchoring effect cannot be expected, resulting in poor adhesion. The upper limitation of the surface roughness is not particularly limited. However, if Ra and Rz are excessively high, an applicator roll is more likely to be damaged at the time of roll coater application and frequency of replacement of the roll with new one increases, which is not economical in practical use, for example. Therefore, although not particularly limited to, the upper limits are approximately 2 μm for (Ra) and 10 μm for (Rz). As a method of obtaining the target surface roughness, any of a method of making the surface of a raw material rough by blast treatment, a method of etching the target surface electrochemically, and the like, may be used.

Preferably, the metal powder in the coating has an average particle diameter of 30 μm or less (more preferably 20 μm or less, further preferably 1 μm or more but 16 μm or less), and a density of 4.0 Mg/m or less (more preferably 1.0 Mg/m$^3$ or more but 3.6 Mg/m$^3$ or less). If the application of the coating is performed using a top-feed system when the density is too high or the average particle diameter is too large, comparatively heavy particles can also be applied uniformly on the surface of the raw material, but the metal powder precipitates in the thus-applied coated layer before completion of drying. The binder component becomes rich near the surface of the coated layer and the metal powder becomes rich near the interface with the raw material, resulting in deterioration of brazing property. The preferable deposition amount of the coated layer after drying is 3 to 20 g/m$^2$ when the metal powder contains a flux alone, or 5 to 30 g/m$^2$ when the metal powder contains a flux and a filler material.

Figure 15:
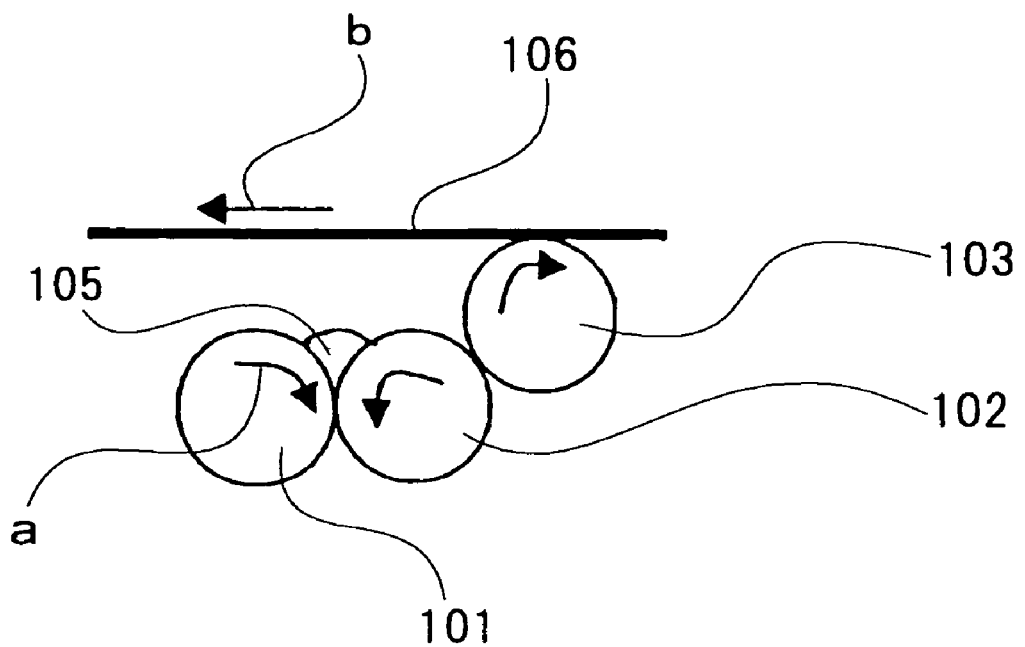
FIG. 15 is a schematic diagram of a three-roll coating method with a top-feed/reverse system.
Figure 16:
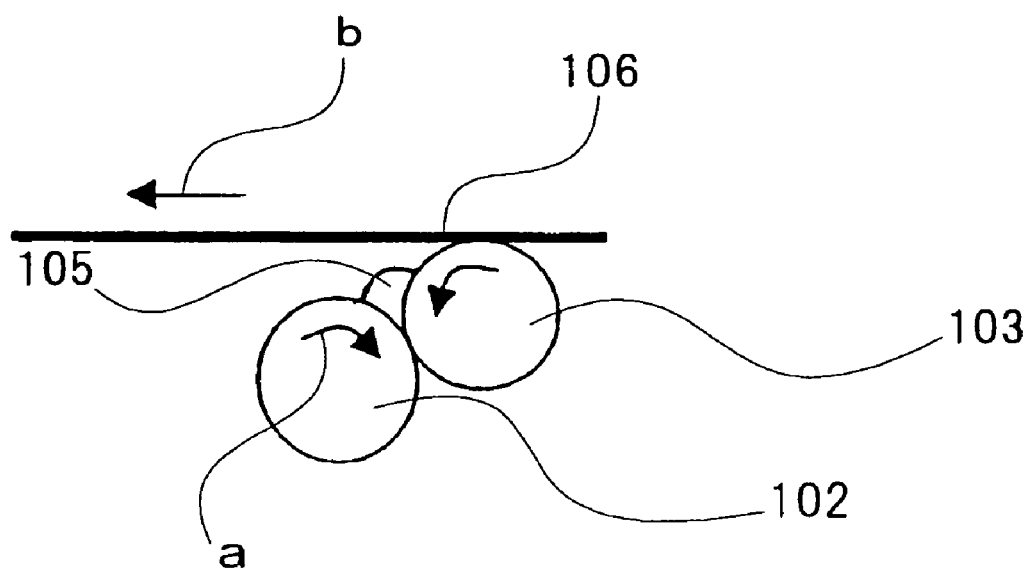
FIG. 16 is a schematic diagram of a two-roll coating method with a top-feed/natural system.
Figure 17:
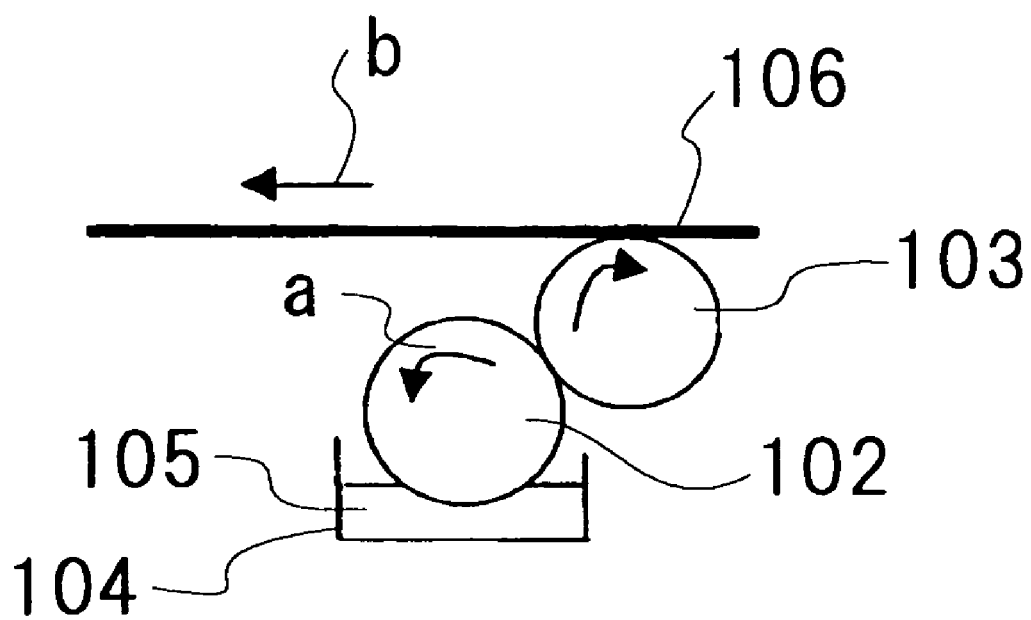
FIG. 17 is a schematic diagram of a two-roll coating method with a bottom-up/reverse system.
Figure 18:
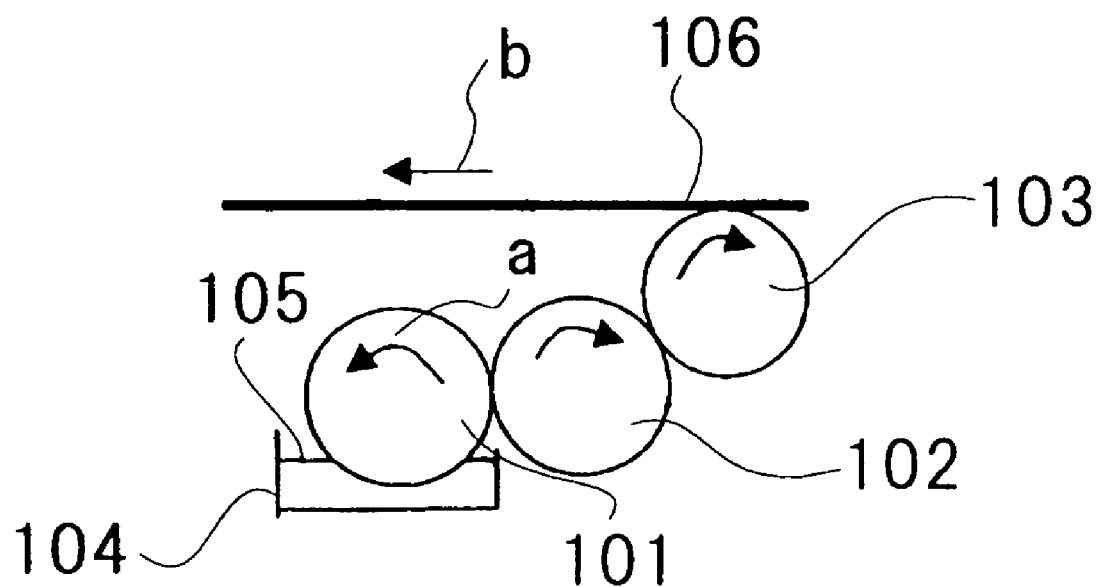
FIG. 18 is a schematic diagram of a three-roll coating method with a bottom-up/natural system.

As a three-roll coating method, a top-feed system is preferable. A schematic view of the top-feed system is shown in FIG. 15. In the figure, the reference symbol a denotes an arrow that indicates the rotation direction of a roll, and the reference symbol b denotes an arrow that indicates the forward direction of movement of a flat multi-cavity tube (coil). In FIG. 15, a coating 105 supplied from above to a space between a metering roll 101 and a pickup roll 102, is transferred to an applicator roll 103; and then the coating 105 is roll-coated on the flat surface of a flat multi-cavity tube 106 by the applicator roll. As shown in the figure, the top-feed system does not require a coater pan (104) and does not cause accumulation of the coating, so a coating containing a high concentration of a metal powder can be applied stably, without causing precipitation of the metal powder. By the use of this system, can be preferably produced the resin-coated aluminum flat multi-cavity tube for an automotive heat exchanger, which is excellent in brazing property, according to the present invention. Further, for the top-feed system, even though there are natural coating (the rotation direction of the applicator roll is the same as the direction of moving the flat multi-cavity tube), and reverse coating (the rotation direction of the applicator roll is opposite to the direction of moving the flat multi-cavity tube), the reverse coating is preferable. In the natural coating, a coated appearance is not good, with the result that the uniformity of the coated layer is impaired and brazing property tends to deteriorate. After the application of the coating by the above method, the coating is dried in a usual manner. Preferably, the drying is performed at a maximum temperature (PMT) of 100 to 200° C. reached by the flat multi-cavity tube at the time of passing through a dryer unit.

The aluminum alloy heat exchanger member of the present invention, preferably the third embodiment, is preferably constructed such that both the flat portions and the curved portions of the aluminum material are totally applied with a coating prepared by mixing/stirring a flux powder, a metal powder, a mixture of the flux powder with the metal powder, or a compound powder containing a metal component and a flux component in an organic binder, by a coating method of a spray method, a brush-coating method or a roll-transfer method alone or in combination thereof; and the entire peripheral surface is coated with a coating layer containing a solid component in the coating.

In the present invention, preferably the third embodiment, as a coating to be applied on the surface of an aluminum alloy heat exchanger member, a coating to be used for a flat portion contacting an aluminum alloy fin material may be the same as a coating to be used for a curved portion sandwiched between the flat portions. Alternatively, different coatings may be used for the respective different requisite functions, for example, a coating that imparts a brazing function may be applied for the flat portion of the member, while a coating that imparts a sacrificial anode effect may be applied for the curved portion of the member.

For coating the curved portion of the aluminum alloy heat exchanger member by a roll transfer method, an applicator roll may be arranged alone, or said roll in combination with two or more rolls, such as a pickup roll and a metering roll, may be arranged. Further, as a method of adjusting the adhesion amount of the coating, a scraper may be used. The surface of the applicator roll contacting the curved portion of the aluminum alloy heat exchanger member may be flat. For supporting the member at application of the coating and stabilizing the coating layer, the applicator roll surface may be formed into a concave shape that fits to the configuration of the curved portion, but not particularly limited to such a configuration, as far as there is no problem in practical use. Further, a material for the resin layer on the surface of the applicator roll, materials for the pickup roll and metering roll, and a surface-treatment method such as plating are not particularly limited to, as far as there is no problem in application of the coating.

If the curved portion of the aluminum alloy heat exchanger member is coated by a spray method, the material and shape for the path for supplying the coating in a spray main body are not particularly limited to, as far as there is no change in quality or corrosion by contacting with the coating and the path can endure pressures applied. Further, spray patterns and spray pressures are not particularly limited to, as far as given characteristics of the coated layer can be obtained.

When the curved portion of the aluminum alloy heat exchanger member is coated by a brush-coating method, the material and shape of a brush are not particularly limited to, as far as there is no change in quality and corrosion by contact with the coating and also there is no abrasion on the surface of the aluminum alloy heat exchanger member. Thus, a non-metal material such as a resin, is preferable.

For the application of the coating on the curved portion of the aluminum alloy member, a combination of two or more coating methods selected from a roll transfer method, a spray method, and a brush method, may be used.

For the application of the coating on the surface of the aluminum alloy heat exchanger member, the timing of coating the curved portion is preferably, but not particularly limited to, before the application of the coating on the flat portion. This is because, as the thick coated layer on the flat portion exerts an influence on the core breakage, it is advantageous to conduct the application of the coating on the curved portion, which does not exert an influence on core breakage, beforehand, in view of product characteristics.

Next, the present invention, preferably the third embodiment, will be described based on preferred examples as illustrated in the drawings.

Figure 19:
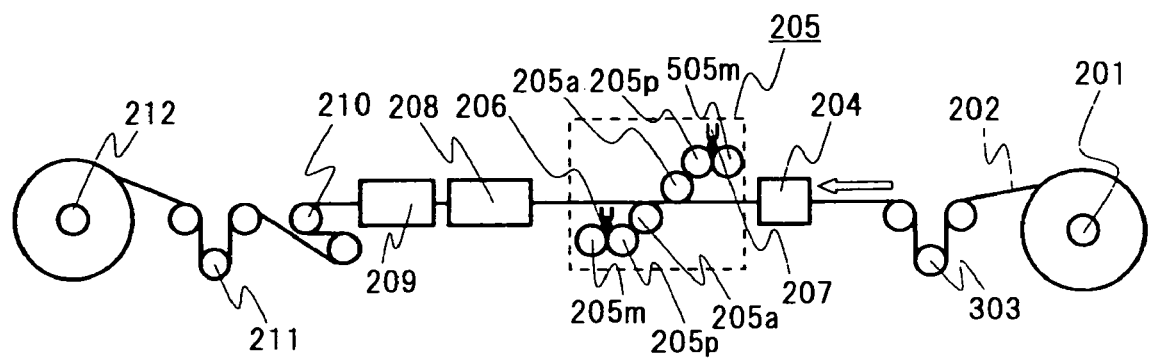
FIG. 19 is a schematic view for illustrating an example of a configuration of the apparatus of the present invention for producing an aluminum alloy automotive heat exchanger member.

The flow of the application of the coating will be explained along the coating line as shown in FIG. 19. An aluminum alloy member (e.g., a flat multi-cavity tube) (202) is unwound from an uncoiler (201) and passed through a tension roll (203), followed by forming a coated layer on both of curved portions (202R) on a curved portion coating device (204). Then, a roll coater (205) for coating flat portion applies a coating on both upper and lower surface portions (202F). The roll coater (205) is constructed such that, as shown in the figure, three rolls, i.e., an applicator roll (205*a*), a pickup roll (205*p*), and a metering roll (205*m*), are arranged on each of the upper and lower flat portions of the aluminum alloy member (202). Meanwhile, FIG. 19 illustrates an example in which the upper and lower applicator rolls are arranged while displaced from each other. A coating (206) is supplied from respective coating-supplying pipes (207) to predetermined positions. Regarding the curved portion coating device (204), a spray (204s) may be used for a method of supplying the coating to the roll or brush when a coating method is a roll transfer or brush coating method. After coating, the coated member is heat-dried, for example, by an electromagnetic-type heating furnace (208) at 120 to 200° C. The aluminum alloy member (202) after heat-dried, is cooled down to a given temperature in a cooling device (209), and then the cooled aluminum alloy member (202) passes through a driving device (210) and a tension roll (211), followed by rewinding around a recoiler (212).

FIGS. 20 to 23 each schematically illustrate the method of applying the coating on the curved portion by a roll transfer method.

Figure 20:
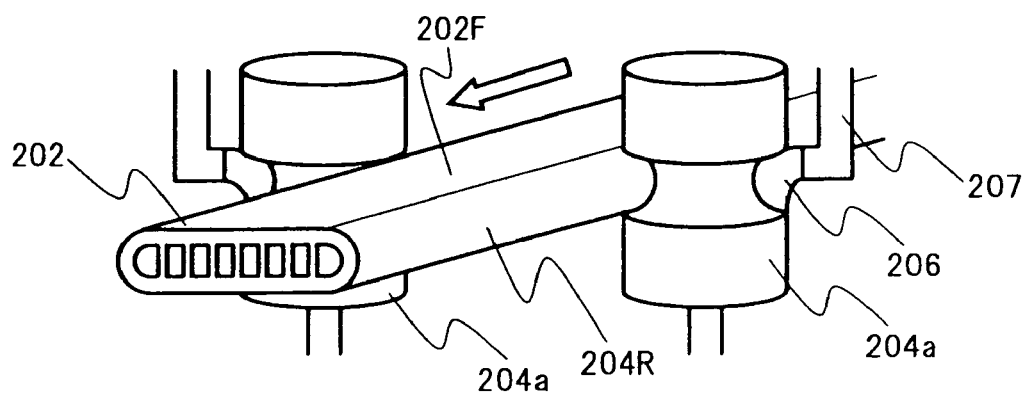
FIG. 20 is a diagram for illustrating a mechanism of application of a coating on a curved portion by means of a vertical-type single-roll transfer method.

FIG. 20 illustrates a state of single-roll coating in which the coating (206) is supplied to an applicator roll (204a), to coat on both the curved portions (202R) of the aluminum alloy member (202) with the coating. Herein, an outline arrow in the figure indicates a moving direction at the time of coating the member. At this time, the positional relationship between the applicator rolls (204a) may be set such that they are located at opposed positions sandwiching the aluminum alloy member (202) or may be displaced with an interval within the range of approximately 500 mm from said opposed positions.

Figure 21:
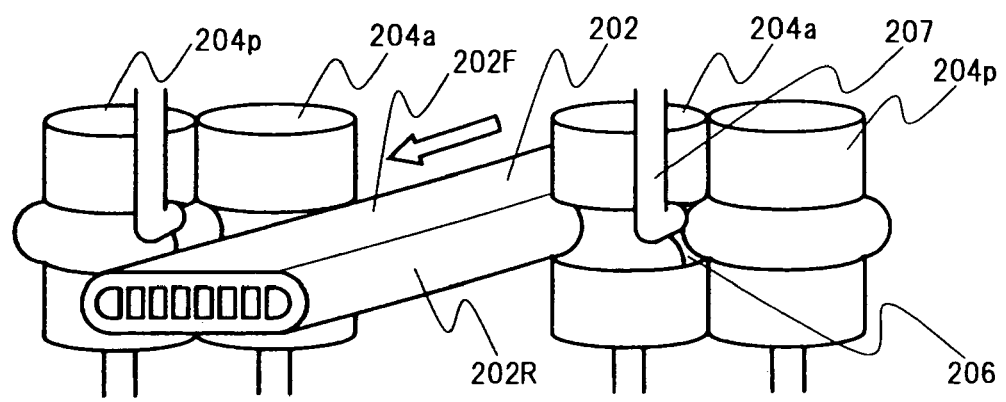
FIG. 21 is a diagram for illustrating a mechanism of application of a coating on a curved portion by means of a vertical-type multi-roll transfer method.

FIG. 21 illustrates a state of applying the coating in which two rolls of the applicator roll (204a) and the pickup roll (204p), are arranged. In this case, the coating (206) is supplied to the applicator roll (204a) or the pickup roll (204p), or between the applicator roll (204a) and the pickup roll (204p). Although not shown in the figure, a metering roll may be arranged outside the pickup roll (204b). In that case, the coating (206) is preferably supplied between the pickup roll (204p) and the metering roll.

Figure 22:
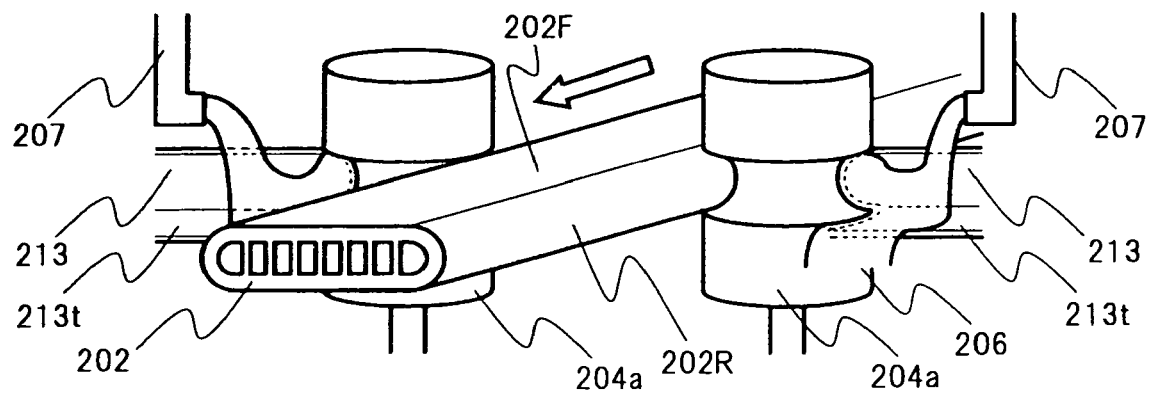
FIG. 22 is a diagram for illustrating a mechanism of application of a coating on a curved portion with a roll transfer method when a scrapper is used.

FIG. 22 illustrates a coating method in which the adhesion amount of the coating (206) is adjusted using a scraper (213), instead of the pickup roll (204p). The coating (206) may be directly supplied to the applicator roll (204a), or a flange (213t) for introducing the coating (206) to the applicator roll (204a) may be added to the scraper (213). The adhesion amount of the coating is adjusted, by changing the gap between the scraper (213) and the applicator roll (204a).

Figure 23:
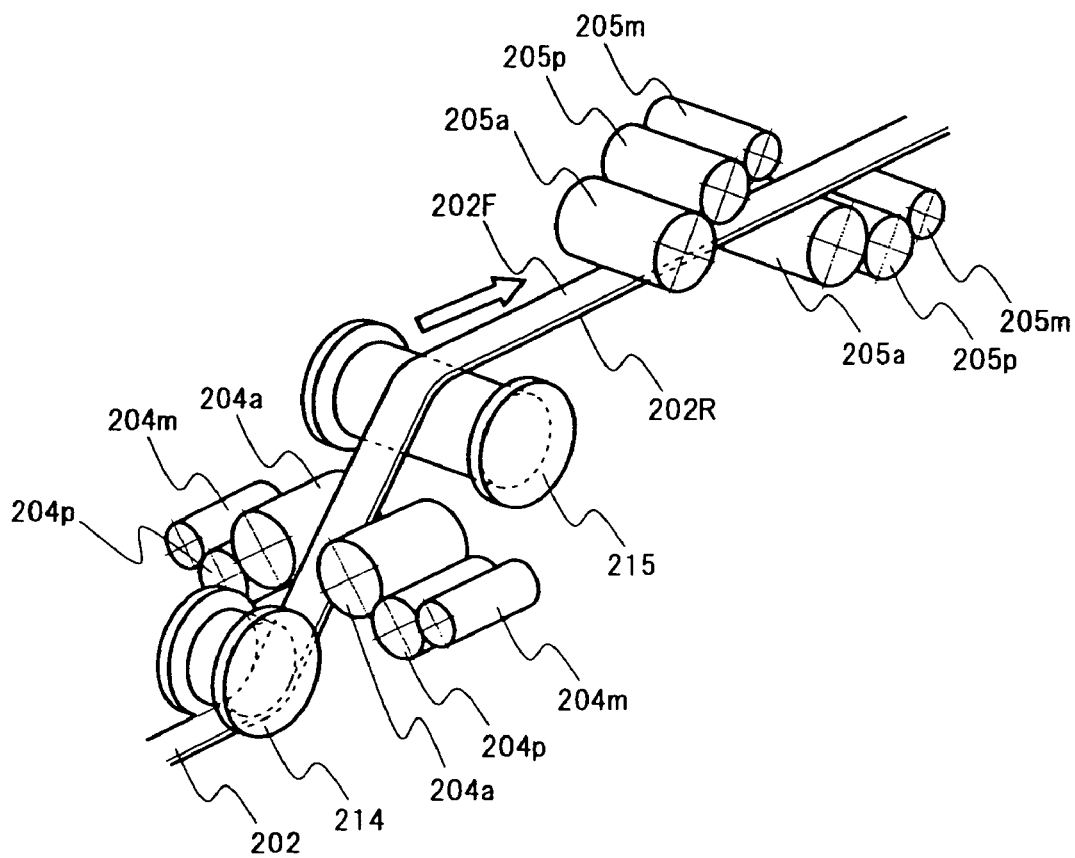
FIG. 23 is a diagram for illustrating a mechanism of application of a coating on a curved portion by means of a horizontal-type multi-roll transfer method.

FIG. 23 illustrates a state in which coating rolls for the curved portion are arranged in a horizontal direction. As the respective rolls are arranged in a horizontal direction, for allowing the application of the coating in a horizontal direction, the aluminum alloy heat exchanger member (202) is inclined at a given angle against the moving direction of the member (202), by means of supporting rolls (214) and (215). The tilt angle is preferably within the range of 10° to 1700. Although not shown in the figure, the coating (206) is supplied between the pickup roll (204p) and the metering roll (204m). The number of rolls to be arranged may be two, i.e., the applicator roll (204a) and the pickup roll (204p).

Figure 24:
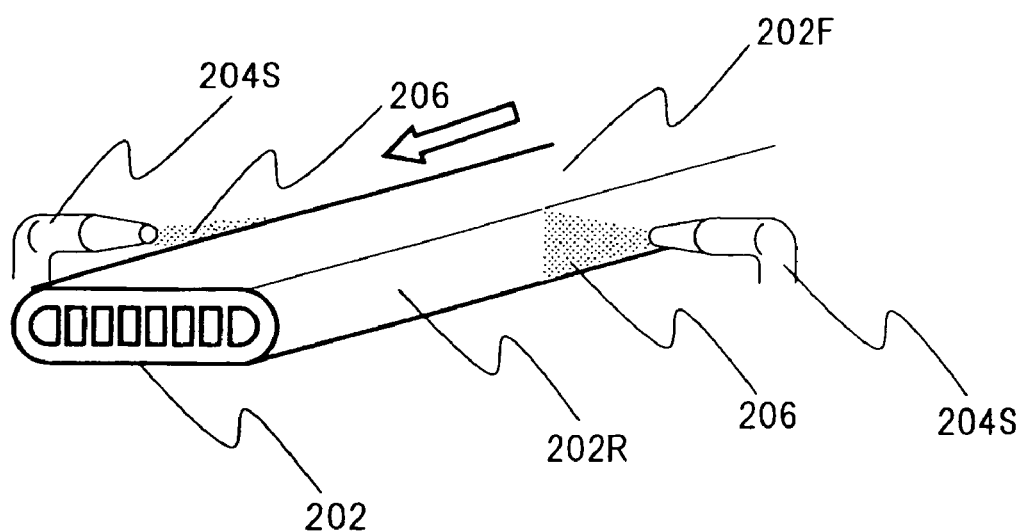
FIG. 24 is a diagram for illustrating a mechanism of application of a coating on a curved portion by means of a spray method.

FIG. 24 illustrates an example of the state of application of the coating on the curved portion (202R) by a spray method. In this method, a predetermined amount of the coating (206) is sprayed from a nozzle of the spray (204S), and applied on both the curved portions (202R) of the aluminum alloy heat exchanger member (202).

Figure 25:
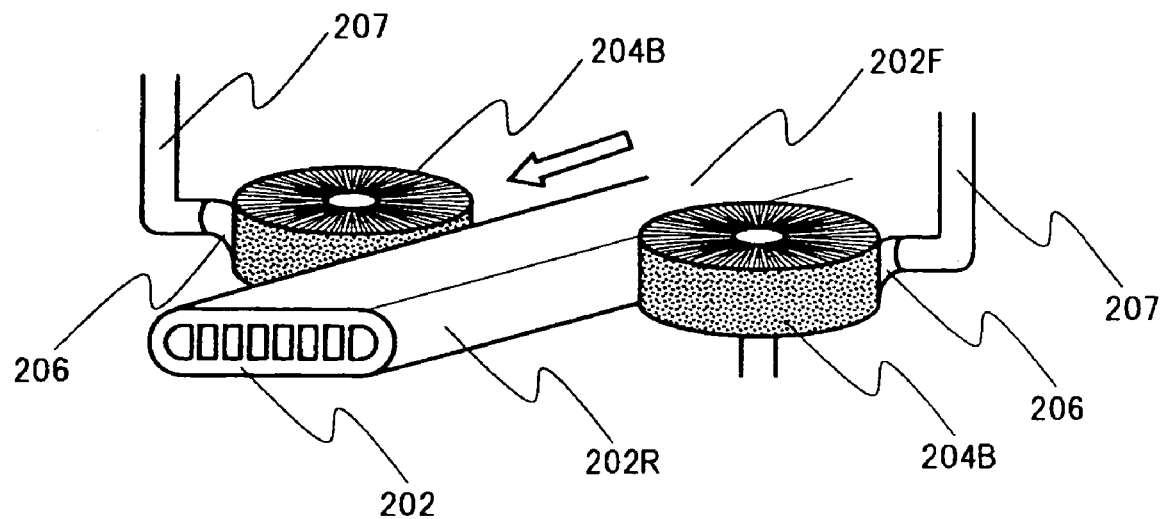
FIG. 25 is a diagram for illustrating a mechanism of application of a coating on a curved portion by means of a brush-coating method.

FIG. 25 illustrates an example of the state of application of the coating on the curved portion (202R) by a brush-coating method. In this method, the coating (206) is supplied to a rotating brush (204B) via the coating-supplying pipe (207), followed by coating both the curved portions (202R) of the aluminum alloy heat exchanger member (202).

Figure 26:
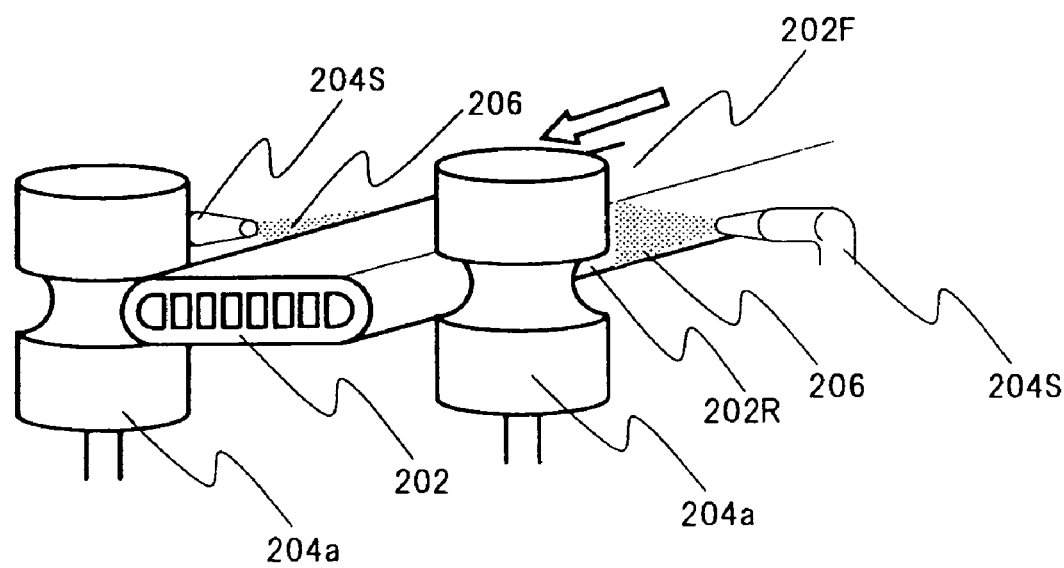
FIG. 26 is a diagram for illustrating a mechanism of application of a coating on a curved portion with a combination of a spray method and a vertical-type single-roll transfer method.

FIG. 26 illustrates an example of the state of application of the coating on the curved portion (202R), when the roll transfer method is used in combination with the spray method. In this method, the coating (206) applied by the spray (204S) is subjected to the control of film thickness with the applicator roll (204a), allowing the formation of a more uniform thin film.

Figure 27:
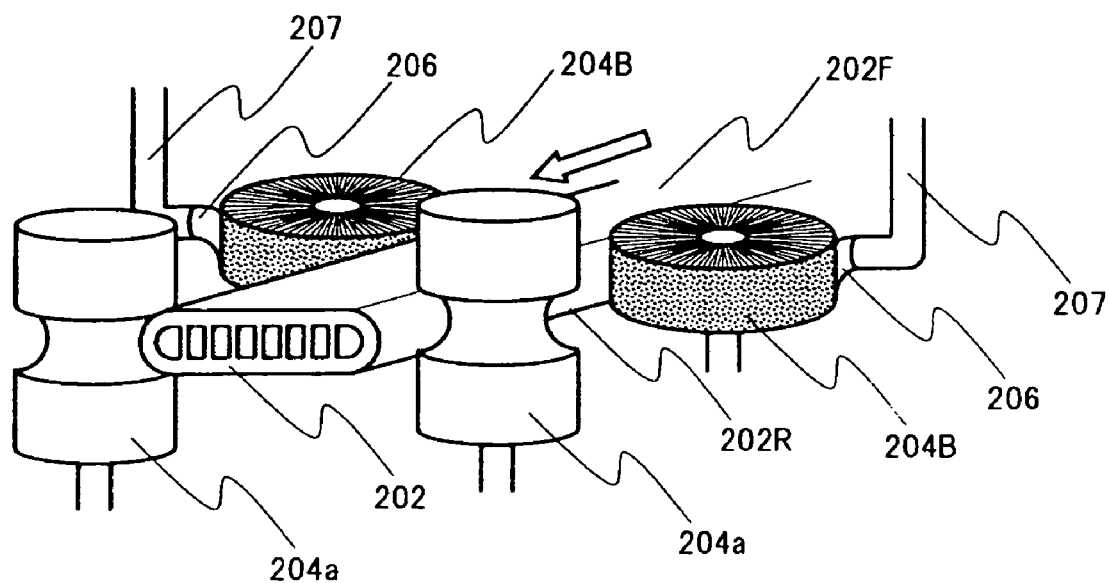
FIG. 27 is a diagram for illustrating a mechanism of application of a coating on a curved portion with a combination of a brush method and a vertical-type single-roll transfer method.

FIG. 27 illustrates an example of the state of application of the coating on the curved portion (202R), when the roll transfer method is used in combination with the brush method. In this method, also, the coating (206) applied by the brush (204B) is subjected to the control of film thickness with the applicator roll (204a), allowing the formation of a more uniform thin film.

Figure 28:
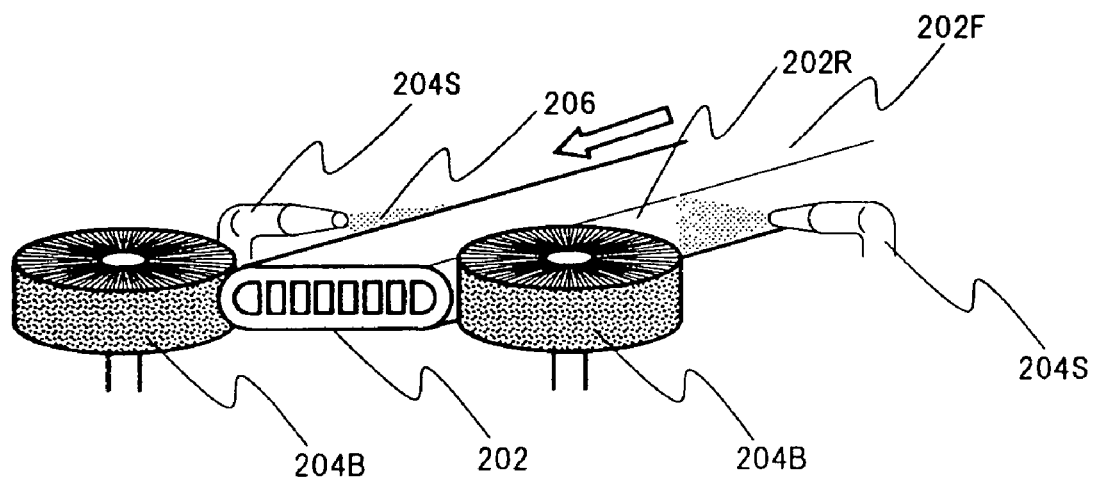
FIG. 28 is a diagram for illustrating a mechanism of application of a coating on a curved portion with a combination of a spray method and a brush method.

FIG. 28 shows an example of the state of application of the coating on the curved portion (202R), when the brush method is used in combination with the spray method. Also in this method, the coating (206) applied by the spray (204S) is subjected to the control of film thickness with the brush (204B), allowing the formation of a more uniform thin film.

In the present invention, an embodiment in which any two of the above first, second, and third embodiments are combined each other is also preferable, and an embodiment in which all the three embodiments are combined is particularly preferable.

According to the present invention, can be provided a method of producing a heat exchanger member made of an aluminum alloy, which is excellent in uniformity and adhesion of a flux coated layer applied thereon, under conditions of continuous and high-speed application of the coating. Further, the coating apparatus of the present invention is a coating apparatus preferable for carrying out the above production method. Further, the present invention can provide a flux-applied aluminum alloy member for an automotive heat exchanger obtained by means of such a method of producing an aluminum alloy member for an automotive heat exchanger.

According to the present invention, can be provided an aluminum flat multi-cavity tube for an automotive heat exchanger, having excellent uniformity and adhesion of a coated layer and sufficient bonding (adhesion) property by brazing. The present invention can also provide a method producing the aluminum flat multi-cavity tube for an automotive heat exchanger.

Further, according to the present invention, can be provided a member made of an aluminum alloy for an automotive heat exchanger excellent in the product characteristics after braze-heating, especially corrosion resistance at a curved portion of said aluminum alloy heat exchanger member.

The present invention will be described in more detail based on examples given below, but the invention is not meant to be limited by these.

EXAMPLES

Example 1-1

Figure 10:
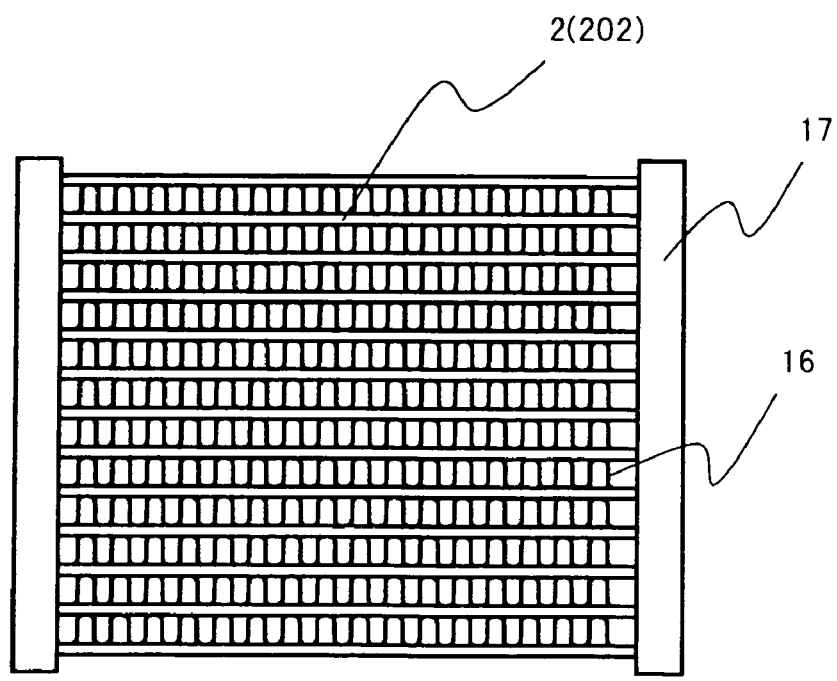
FIG. 10 is a diagram for illustrating a configuration of a heat exchanger core.

A flat multi-cavity tube 2 made of an A1050 aluminum alloy (19 cavities, 16 mm in width, 1.8 mm in high, 1.0 mm×0.6 mm in cavity size, and 0.3 mm in thickness) extruded by means of a conform extrusion method, was used; and both the top and back sides of the tube 2 was coated, with a coating apparatus as shown in FIG. 1, under the conditions of a coating chamber temperature of 25° C. The moving speed of the flat multi-cavity tube at the time of application of the coating was 80 m/min, the circumferential speed of the applicator roll 4a (200 mm in outer diameter) was 100 m/min, the circumferential speed of the pickup roll 4p (200 mm in outer diameter) was 50 m/min, and the circumferential speed of the metering roll 4m (200 mm in outer diameter) was 15 m/min. The transferring method for each roll was of the A system, as shown in FIG. 4. That is, the applicator roll 4a and the metering roll 4m were rotated in the direction opposite to the moving direction of the flat multi-cavity tube 2, and the pickup roll 4p was rotated in the same direction as the moving direction of the flat multi-cavity tube 2. A flux compound that was a solute to be used was $KZnF_3$ whose average particle diameter was 2 μm to 6 μm. The reason this flux compound was used, is that quantitative evaluation for verifying the uniformity of the coated layer after application of the coating can be performed, by substituting for the state of Zn diffusion after heating for brazing. The adhesion amount of said flux compound and the solid content of the binder per unit area was within the range of 8 $g/m^2$ to 12 $g/m^2$, thereby to provide Sample Nos. 1 to 4 in Table 1. The adhesion amount of the flux compound per unit area and the average particle diameter thereof were selected, by performing experiments in advance; and in the evaluation items such as brazing property, it was confirmed that there was no trouble in use. The flux was mixed and stirred with an acrylic resin solution (the binder solid content of 15% by mass), at a proportion of 85:15 of the flux and the acrylic resin in terms of mass ratio, to prepare the coating 10. The coating 10 was applied on the surface of the flat multi-cavity tube 2 in a coil shape; and then the coated tube was dried in an electromagnetic induction heating furnace 5 of 100 kW in power, 20 mm in coil inner diameter, and 1 m or 2 m in furnace length (1.1 seconds in passage period, and 180° C. of the coating's actual temperature). Then, the tube thus dried was cooled by the air at room temperature, followed by winding up. The aluminum alloy flat multi-cavity tube 2 after coating was combined with a fin material 16 prepared by corrugate-forming an aluminum alloy clad sheet material (a core material, A3103; and a clad material, A4045) of 70 μm in thickness, and a header pipe material 17, to assemble a heat exchanger core, as shown in FIG. 10, followed by a brazing process at 600° C. for 5 minutes in a nitrogen gas atmosphere, to joint these.

Example 1-2

Sample Nos. 5 to 8 shown in Table 1 were prepared in the same manner as in Example 1-1, except by using the system B as shown in FIG. 5, as a roll transfer system, but other conditions were the same as those of Example 1-1. The thus-prepared coated materials were subjected to the brazing process under the same conditions as those of Example 1-1. The furnace length of the induction heating furnace was 1 m for the production speed of 80 m/min (Nos. 1 to 3 and 5 to 7), or 2 m for the production speed of 160 m/min (Nos. 4 and 8).

Comparative Example 1-1

Sample Nos. 9 to 12 were prepared in the same manner as in Example 1-1 under the conditions including the drying method and the coating's characteristics, except that a conventional system C as shown in FIG. 3 was used as a roll transfer system. The thus-prepared coated materials were subjected to the brazing process under the same conditions as those of Example 1-1.

Reference Example 1-1

Sample Nos. 13 to 16 were prepared in the same manner as in Example 1-1 under the conditions including the roll transfer system and the coating's characteristics, except that the hot air furnace 14 was used for the drying method as shown in FIG. 8. The temperature of an atmosphere inside the hot air furnace 14 in the drying method was set to be 220° C. The reason for setting at 220° C. is as follows. A normal brazing process is inhibited as an acryl resin component is decomposed when the sample is heated at a temperature over 230° C., so the above 220° C. is the highest heating temperature within the range that does not exert any influence on the brazing process. The hot air furnaces of 1 m, 4 m, and 8 m in furnace length were used, respectively. The thus-prepared coated materials were subjected to the brazing process under the same conditions as those of Example 1-1.

The thus-applied coated layer was evaluated for coating characteristics including adhesion property, brazing property, and uniformity.

The adhesion property was evaluated by means of the pencil hardness test method with a pencil in accordance with JIS.

The brazing property was evaluated by: cutting a sample for evaluation out of the heat exchanger core after brazing; cutting the fin material 16 in said cut-portion out of the aluminum alloy flat multi-cavity tube 2; and measuring a bonding ratio in 200 bonded portions on the bonded surface (the bonding ratio=(the number of bonded points/200)×100), and the number of un-bonded inferior fin corrugated-threads.

Figure 11B:
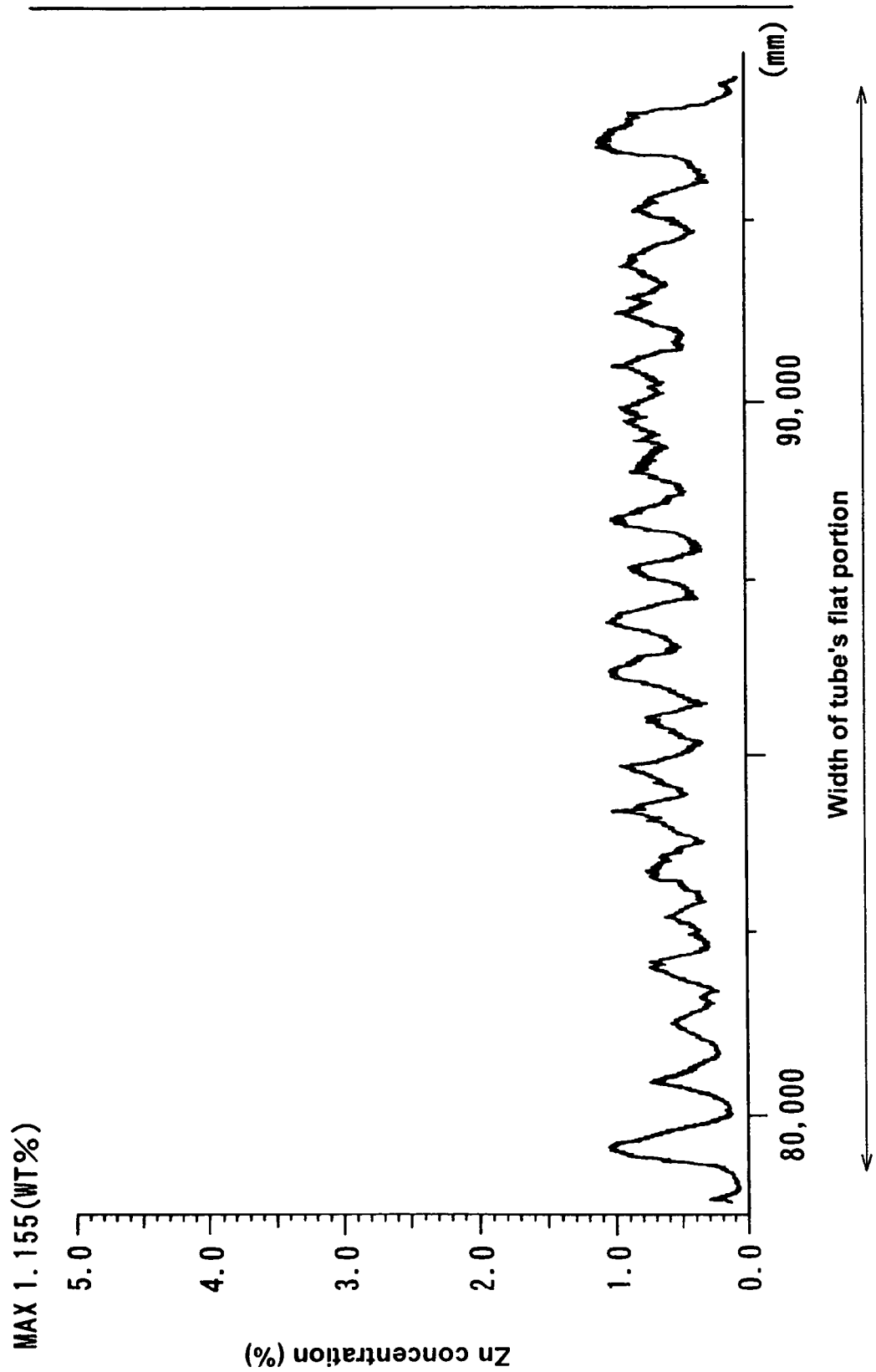
Figure 29:
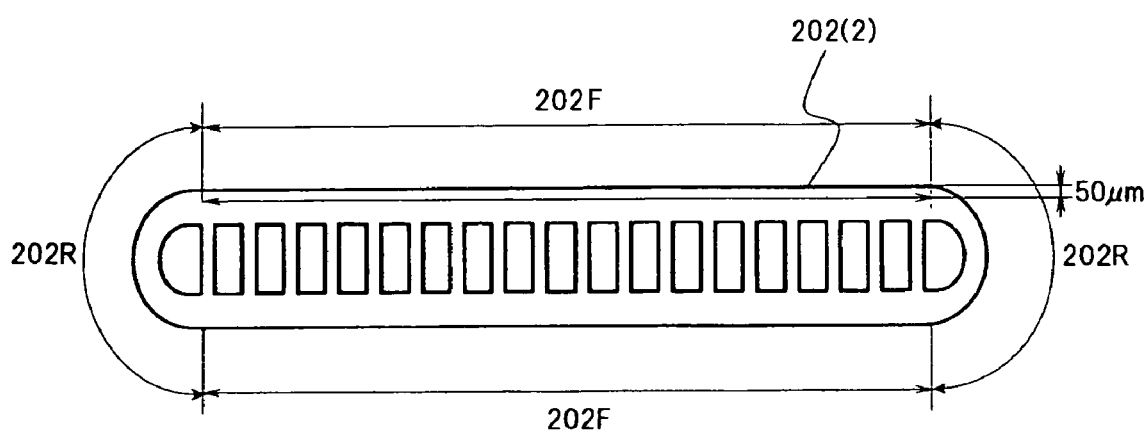
FIG. 29 is a schematic cross sectional view of a flat multi-cavity tube having 19 cavities, which shows a position to be measured in a method of measuring a Zn concentration after brazing.

The uniformity was evaluated by means of the following methods: A method, using a coating rate (the coating rate= (coated area/1,000)×100) of the coated flat multi-cavity tube 2 of 6.67 m in length (the surface area of the flat portion 1,000 $mm^2$, except of both R end portions of the cross section of the aluminum alloy flat multi-cavity tube 2); and a method including the steps of: subjecting the thus-brazed aluminum alloy flat multi-cavity tube to resin-embodying polishing; line-analyzing, by EPMA, a Zn concentration in the transverse (width-wise) direction of the flat multi-cavity tube 2 at a position of approximately 50 μm in depth from the coated surface, as shown in FIG. 29; and conducting evaluations with an average value (corresponding to the maximum (Max) in Table 1) of the numerical values from the maximum value of the thus-measured Zn concentration to the 10th value from the maximum in order, and an average value (corresponding to the minimum (Min) in Table 1) of the numerical values from the minimum value of the Zn concentration to the 10th value from the minimum in order. FIG. 11(a) shows a pattern passed the test, and FIG. 11(b) a pattern not passed the test, in the Zn concentration distribution, respectively.

Taking the assembling property and corrosion resistance of the heat exchanger core into consideration, the judgment levels whether a sample would pass/not pass a test of the respective evaluated characteristics, are as follows. The pencil hardness test (adhesion property)≧3B, i.e. the hardness of the sample was the same as 3B or harder than 3B; the bonding ratio (brazing property)≧96%; the number of un-bonded corrugated-threads≦4 threads; the coating ratio≧97%; the Zn concentration: the minimum value>0.7, and (the maximum value−the minimum value) (i.e. the difference, $\Delta$)≦1.0, were judged to pass the tests, respectively.

TABLE 1

| | | Coating conditions | | | Drying conditions | | |
|---|---|---|---|---|---|---|---|
| | Sample No. | Flux adhesion amount (g/m$^2$) | Average particle diameter (μm) | Product speed (m/min) | Heating method | Furnace length (m) | Roll rotation system |
| Example 1-1 | 1 | 8.5 | 4.3 | 80 | Electromagnetic induction | 1 | A |
| | 2 | 8.9 | 5.5 | 80 | Electromagnetic induction | 1 | A |
| | 3 | 11.4 | 6.2 | 80 | Electromagnetic induction | 1 | A |
| | 4 | 8.5 | 5 | 160 | Electromagnetic induction | 2 | A |
| Example 1-2 | 5 | 8.2 | 5.8 | 80 | Electromagnetic induction | 1 | B |
| | 6 | 10.3 | 3.4 | 80 | Electromagnetic induction | 1 | B |
| | 7 | 11.8 | 4.6 | 80 | Electromagnetic induction | 1 | B |
| | 8 | 9.5 | 4.8 | 160 | Electromagnetic induction | 2 | B |
| Comparative example 1-1 | 9 | 8.7 | 4.0 | 80 | Electromagnetic induction | 1 | C |
| | 10 | 9.9 | 2.5 | 80 | Electromagnetic induction | 1 | C |
| | 11 | 10.5 | 5.0 | 80 | Electromagnetic induction | 1 | C |
| | 12 | 9 | 5.2 | 160 | Electromagnetic induction | 1 | C |
| Reference example 1-1 | 13 | 8.6 | 5.9 | 80 | Hot air | 1 | A |
| | 14 | 9.7 | 2.6 | 80 | Hot air | 4 | A |
| | 15 | 11.9 | 4.8 | 80 | Hot air | 8 | A |
| | 16 | 9.2 | 5.0 | 160 | Hot air | 8 | A |

| | | Evaluation results | | | | | | | |
|---|---|---|---|---|---|---|---|---|---|
| | | | | | Zn concentration | | | Number of air bubbles generated | | |
| | Sample No. | Adhesion property | Bonding ratio (%) | Number of un-bonded threads | Coating ratio (%) | Maximum (%) | Minimum (%) | Difference (%) | Maximum (Number) | Minimum (Number) | Average (Number) |
| Example 1-1 | 1 | F | 100 | 0 | 100 | 1.7 | 1.4 | 0.3 | 0 | 0 | 0.0 |
| | 2 | H | 98 | 0 | 100 | 1.9 | 1.7 | 0.2 | 0 | 0 | 0.0 |
| | 3 | F | 100 | 0 | 100 | 2.2 | 2.0 | 0.2 | 0 | 0 | 0.0 |
| | 4 | H | 99 | 0 | 100 | 1.9 | 1.8 | 0.1 | 0 | 0 | 0.0 |
| Example 1-2 | 5 | H | 99 | 0 | 100 | 1.7 | 1.5 | 0.2 | 0 | 0 | 0.0 |
| | 6 | H | 100 | 0 | 100 | 1.9 | 1.6 | 0.3 | 0 | 0 | 0.0 |
| | 7 | H | 100 | 0 | 100 | 2.1 | 1.9 | 0.2 | 0 | 0 | 0.0 |
| | 8 | H | 100 | 0 | 100 | 2.0 | 1.9 | 0.1 | 0 | 0 | 0.0 |
| Comparative example 1-1 | 9 | H | 99 | 0 | 100 | 1.9 | 0.5 | 1.4 | 0 | 0 | 0.0 |
| | 10 | F | 98 | 0 | 100 | 2.0 | 0.6 | 1.4 | 0 | 0 | 0.0 |
| | 11 | F | 97 | 0 | 100 | 2.2 | 0.8 | 1.4 | 0 | 0 | 0.0 |
| | 12 | H | 99 | 0 | 100 | 2.1 | 0.6 | 1.5 | 0 | 0 | 0.0 |
| Reference example 1-1 | 13 | — | — | — | — | — | — | — | — | — | — |
| | 14 | 6B | 54 | 48 | 51 | 2.0 | 0.3 | 1.7 | 75 | 34 | 56.0 |
| | 15 | 4B | 92 | 8 | 92 | 2.2 | 1.0 | 1.2 | 78 | 48 | 60.0 |
| | 16 | — | — | — | — | — | — | — | — | — | — |

Note)
In the above table, the mixing ratio of the flux and the acrylic resin solution (binder solid content, 15 mass %) was 85:15 in mass ratio of the flux to the acrylic resin.

As is apparent from Table 1, Sample Nos. 1 to 8 prepared under the conditions of Examples 1-1 and 1-2 according to the present invention, exhibited excellent results with respect to all of the characteristics of the adhesion property, the bonding ratio, the number of un-bonded threads, the coated ratio, and the Zn concentration.

Figure 12:
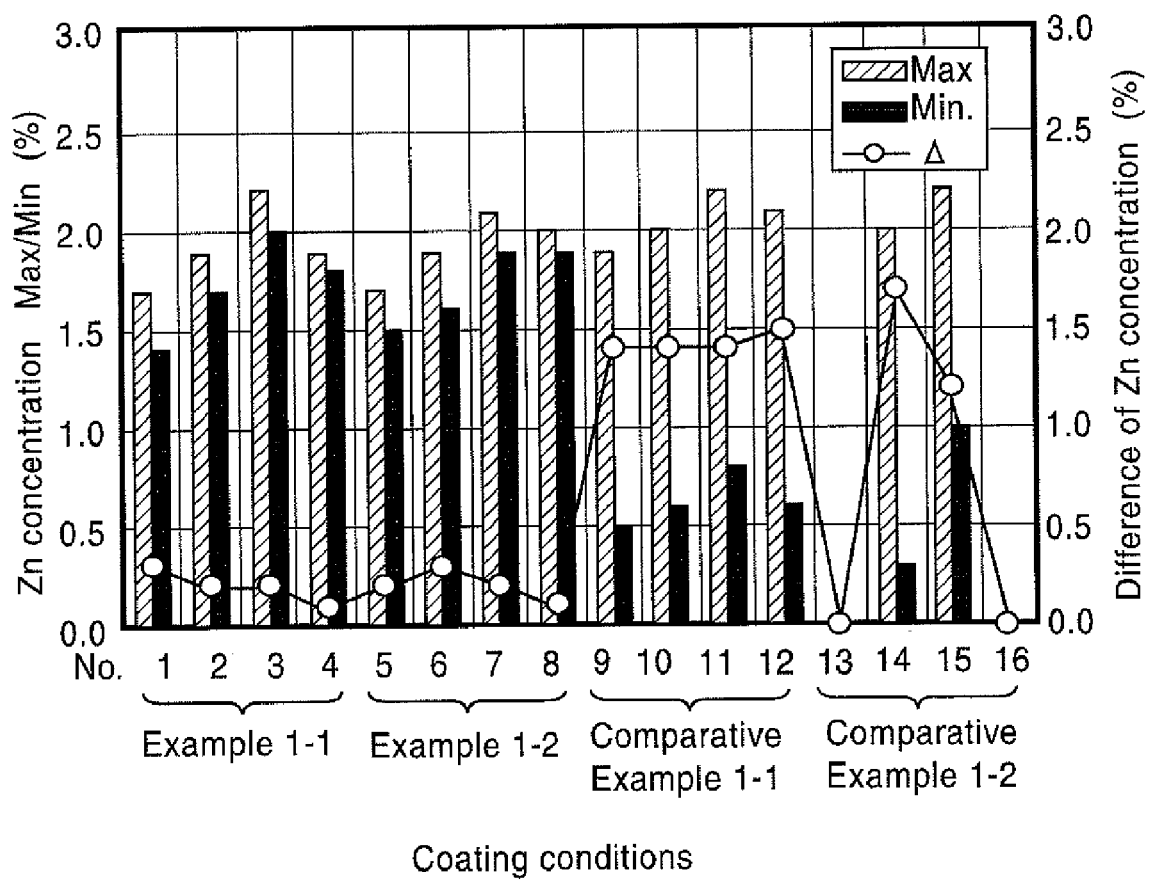
FIG. 12 is a diagram to show comparison of variations in Zn concentration after brazing.
Figure 13:
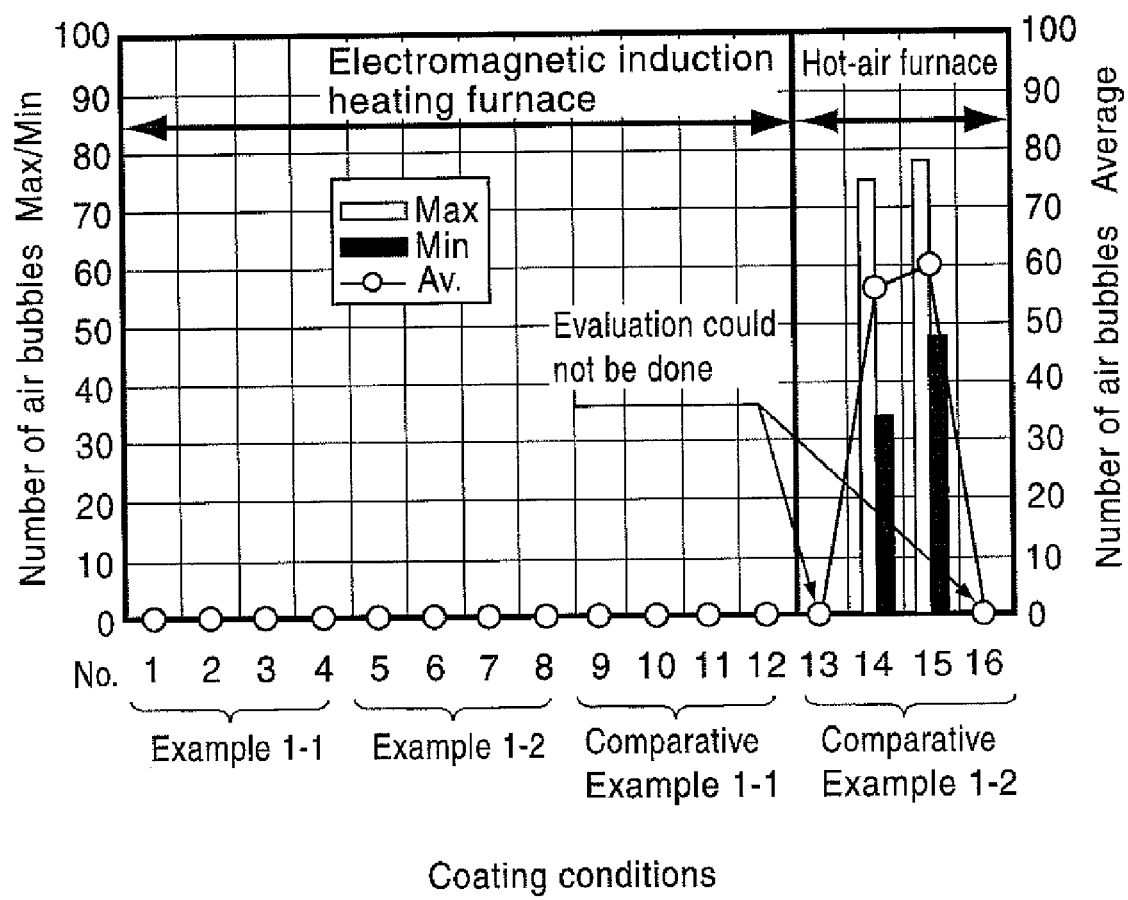
FIG. 13 is a diagram to show comparison of the number of air bubbles generated inside a coated layer after brazing.

In Comparative Example 1-1 and Reference Example 1-1, it is confirmed that at least one of the characteristics of the adhesion property, the bonding ratio, the number of un-bonded threads, the coated ratio, and the Zn concentration was poor. Considering each of the samples in the below, in Sample Nos. 9 to 12, in the coated upper face side in FIG. 6, the rotation of the applicator roll and the rotation of the pickup roll were in the same direction. As a result, any shearing force with the applicator roll and the pickup roll did not work on the coating, dark and light linear patterns of the coating on the surface of the pickup roll were directly transferred to the surface of the aluminum alloy flat multi-cavity tube, and the adhesion distribution of Zn component became uneven, thereby to cause a portion high in the Zn concentration as well as a portion low in the Zn concentration. The maximum, minimum, and average values of Zn concentration in Table 1 were compared, and the results are illustrated in FIG. 12. Good Zn concentration characteristics were shown in Examples 1-1 and 1-2 according to the present invention. This confirmed that a sufficient corrosion resistance can be secured. Sample Nos. 13 to 16 showed insufficient dryness of the coating and thus the coating was half dried, because of a too short hot-air furnace in length. Further, since the hot air drying system was used, air bubbles were present in the coated layer, so a decrease in coating rate and insufficient adhesion property of the coated layer were caused by the peeling-off of the coated layer upon contact with the driving device or tension roll. In particular, with respect to Sample Nos. 13 and 16, since the product was almost undried, the coated side of the product was in a wet state, and thus the brazing evaluation and the like could not be carried out. The difference in the qualities of coated layers due to the difference in drying system can be also confirmed from the number of generated air bubbles in Table 1. The term "the number of generated air bubbles" used herein means a value obtained by measuring the number of air bubbles, which was generated in the coated layer, in the direction across the full width of the cross section of the top and bottom sides of the material after coating and drying, with a scanning electron microscope. The number of materials measured was set to n5 for each of the 16 different conditions of the examples, the comparative example and the reference example (evaluations cannot be done with respect to Nos. 13 and 16). In each of the samples, the total number of air bubbles generated in both the top and bottom coated surfaces was defined as one data. FIG. 13 shows a graph of the comparison between the numbers of air bubbles generated. This figure also confirms the technical significance of soundness of the inside of the coated layer formed by means of the electromagnetic induction heating method, as compared with the conventional hot air drying method.

Figure 14:
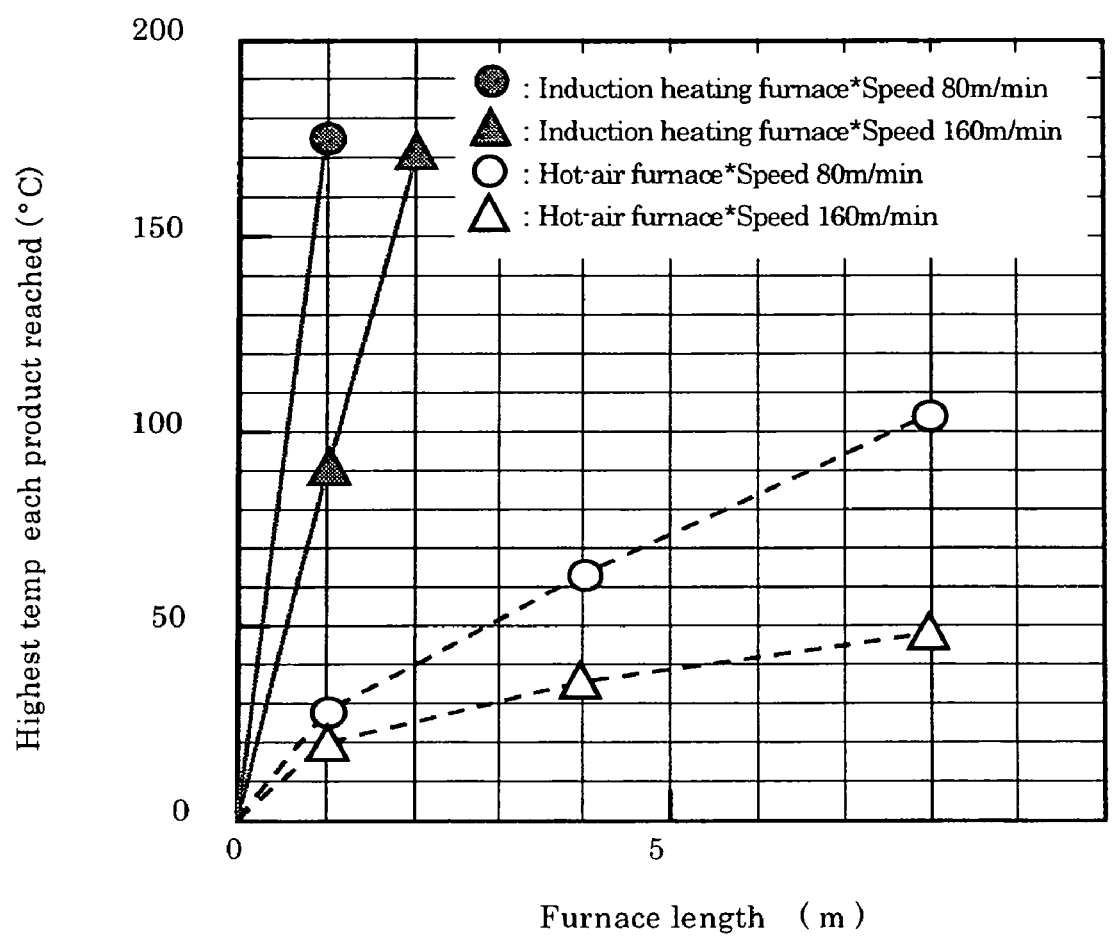
FIG. 14 is a graph showing the results of measuring the maximum reaching temperature for each production speed with respect to each heating method and furnace length.

FIG. 14 shows the results obtained by the measurement of the highest achievable temperatures for each product speed according to the respective heating methods and furnace lengths. The measurement was made by a system in which an irreversible thermo tape was adhered on the surface of a product at normal temperature, and then the product was passed through the heating furnace, followed by reading out the highest temperature at which the thermo tape changed the color. Evaluations were conducted such that the production speed was set at two levels of 80 m/min and 160 m/min. Table 1 shows the results obtained by the product speed of 80 m/min and the furnace length of 1 m, in the induction heating furnace. The results confirmed that the electromagnetic induction heating method could suit the product speed of 160 m/min by doubling the length of the furnace. On the contrary, for the hot-air furnace, in a product speed of 160 m/min, there was almost no temperature-rising effect. Further, even the furnace length was as long as 8 m, the surface of the coated layer was still half-dry. Those results confirmed that the electromagnetic induction heating method in which a tube material is heated from the core provides good heat efficiency and makes it possible to rise the temperature of the product to a high temperature within a short period of time, compared with a hot-air furnace which performs heating at inner furnace atmospheric temperature. Therefore, the electromagnetic induction heating method is found to be a particularly preferable heating method to be applied where a product that moves at a high speed is heated. The quality inside the coated layer described above and the difference in the production highest achievable temperatures of this figure may appear as a difference in adhesion property of the coating as shown in Table 1.

Examples 2-1 to 2-7 and Reference Examples 2-1 to 2-4

The surface roughness of one flat surface of a flat multi-cavity tube (19 cavities, 16 mm in width, 1.8 mm in height, 1.0 mm×0.6 mm in cavity size, and 0.3 mm in thickness) made of A1050 aluminum and extruded by a conform extrusion method, was adjusted. Then, a coil of the flat multi-cavity tube was coated with a metal powder-containing coating for brazing, by a top-feed/reverse 3-roll method, as shown in FIG. 15. Various conditions at this time are shown in Table 2. Then, a usual baking finish was carried out (PMT: 150° C.), to form a metal powder-containing resin layer in which the adhesion amount of a dried coated layer was 5.0 g/m² in the case of the coating in which the metal powder contained the flux only, or a metal powder-containing resin layer in which the adhesion amount of a dried coated layer was 10.0 g/m² in the case of the coating in which the metal powder contained the flux and the filler material. The resin component to be used contained 1.5% by mass of an oxazoline-group-containing polymer as a cross-linking agent, to 98.5% by mass of an acrylic resin. The ratio between the metal powder and the resin component in the coating was adjusted such that the volume content of the metal powder in solid content would be an amount, as shown in Table 2 below.

The adhesion property and brazing property of the resulting resin-coated aluminum flat multi-cavity tubes were evaluated by the following methods. The results are shown in Table 2.

Adhesion property (1): For the resulting resin-coated aluminum flat multi-cavity tube, the pencil hardness at which the coated layer would be peeled off was determined, in accordance with the pencil scratch test method of JIS K 5400.

Adhesion property (2): The resulting resin-coated aluminum flat multi-cavity tube was immersed in a modified oil (Titan press (trade name): manufactured by Toyota Chemical Engineering Co., Ltd.) for a week, and then the pencil hardness was measured by subjecting the tube to the pencil scratch test of JIS K 5400 as described above.

Brazing property: The resulting resin-coated aluminum flat multi-cavity tube was brought into contact with a corrugated member (corrugated fin) prepared by corrugate-forming an aluminum brazing sheet (BS, 70 μm in thickness, a core material: A3103 alloy, a clad material: A4045 alloy) or an A3003 aluminum alloy sheet, and then subjected to brazing for jointing, while kept under nitrogen gas atmosphere at 600° C. for 3 minutes, to evaluate brazing property. The evaluation on the brazing property was carried out by brazing for jointing with the corrugated fin and then peeling the fin off, to measure the bonding ratio of the fin in the same manner as above.

Examples 2-8 to 2-14 and Comparative Examples 2-5 to 2-10

A coil of an aluminum alloy flat multi-cavity tube was subjected to coating by a method as shown in Table 3, to form a metal powder-containing resin layer in which the adhesion amount of a dried coated layer was 10.0 g/m² in the case of the coating in which the metal powder contained the flux only, or a metal powder-containing resin layer in which the adhesion amount of a dried coated layer was 20.0 g/m² in the case of the coating in which the metal powder contained the flux and the filler material. At this time, the types and amounts of the flux and filler material added to the coating, and the contents of the flux and filler material to be contained in the resin layer are shown in Table 3, respectively. Further, each sample was collected 30 minutes after starting the application of the coating. In this series of tests, a coating transferring method was changed, and influence thereof was examined. The various transferring methods adapted are shown in FIGS. 15 to 18, respectively. The adhesion property and brazing property of the resulting resin-coated aluminum flat multi-cavity tubes were evaluated in the same manner as in the Examples 2-1 to 2-7 according to the present invention. The results are shown in Table 3.

As can be understood from the results shown in Table 3, the top-feed/reverse coating method (FIG. 15) provided, in a stable manner, the resin layer that contained the flux and the filler material in a high concentration. On the other hand, the bottom up/reverse coating method (FIGS. 17, 18) failed to provide a resin layer in which the contents of the flux and the filler material would be stable, in the case of a long period of time application of the coating, since the flux and the filler material precipitated in a coater pan 104 within a short period of time. Further, the top-feed/natural coating method (FIG. 16) was effective against the precipitation of the metal powder, but it caused deterioration in the brazing property due to uneven distribution of the metal powder, as well as it wad observed a patter with respect to outer appearance of the coated layer.

TABLE 2

| Classification | No. | Surface roughness Ra µm | Surface roughness Rz µm | Flux Kind | Flux Average particle diameter µm | Flux Density Mg/m³ | Flux Amount to be blended mass % | Filler material Kind | Filler material Average particle diameter µm | Filler material Density Mg/m³ | Filler material Amount to be blended mass % | Volume content of metal powder vol % |
|---|---|---|---|---|---|---|---|---|---|---|---|---|
| Example according to this invention | 2-1 | 0.71 | 5.5 | KZnF₃ | 3.9 | 2.8 | 86 | — | — | — | 0 | 69 |
| | 2-1-a | 0.71 | 5.5 | KZnF₃ | 3.9 | 2.8 | 74 | — | — | — | 0 | 55 |
| | 2-1-b | 0.71 | 5.5 | KZnF₃ | 3.9 | 2.8 | 92 | — | — | — | 0 | 80 |
| | 2-2 | 0.71 | 5.5 | KAlF₄ + K₂AlF₅ | 8.5 | 1.1 | 86 | — | — | — | 0 | 85 |
| | 2-3 | 0.71 | 5.5 | KAlF₄ + K₂AlF₅ | 18.3 | 1.1 | 86 | — | — | — | 0 | 85 |
| | 2-4 | 1.11 | 7.8 | KZnF₃ | 3.9 | 2.8 | 86 | — | — | — | 0 | 69 |
| | 2-5 | 3.1 | 18.6 | KZnF₃ | 3.9 | 2.8 | 86 | — | — | — | 0 | 69 |
| | 2-6 | 0.71 | 5.5 | KZnF₃ | 3.9 | 2.8 | 56 | Si | 11.5 | 2.3 | 30 | 70 |
| | 2-7 | 3.1 | 18.6 | KZnF₃ | 3.9 | 2.8 | 56 | Si—Zn | 16 | 3.6 | 30 | 67 |
| Reference example | 2-1 | 0.31 | 4.4 | KZnF₃ | 3.9 | 2.8 | 86 | — | — | — | 0 | 69 |
| | 2-2 | 0.66 | 2.6 | KZnF₃ | 3.9 | 2.8 | 86 | — | — | — | 0 | 69 |
| | 2-2-a | 0.71 | 5.5 | KZnF₃ | 3.9 | 2.8 | 70 | — | — | — | 0 | 45 |
| | 2-2-b | 0.71 | 5.5 | KAlF₄ + K₂AlF₅ | 8.5 | 1.1 | 93 | — | — | — | 0 | 92 |
| | 2-3 | 0.31 | 4.4 | KZnF₃ | 3.9 | 2.8 | 56 | Si | 11.5 | 2.3 | 30 | 70 |
| | 2-4 | 0.66 | 2.6 | KZnF₃ | 3.9 | 2.8 | 56 | Si | 11.5 | 2.3 | 30 | 70 |

| Classification | No. | Adhesion property Initial stage | Adhesion property After immersing in oil | Brazing property Corrugated fin material | Brazing property Adhesion of fin % |
|---|---|---|---|---|---|
| Example according to this invention | 2-1 | F | B | BS | 100 |
| | 2-1-a | H | H | BS | 92 |
| | 2-1-b | F | B | BS | 98 |
| | 2-2 | F | F | BS | 100 |
| | 2-3 | H | H | BS | 98 |
| | 2-4 | H | H | BS | 100 |
| | 2-5 | 2H | 2H | BS | 100 |
| | 2-6 | F | B | A3003 | 100 |
| | 2-7 | 2H | 2H | A3003 | 100 |
| Reference example | 2-1 | H | 5B | BS | 100 |
| | 2-2 | H | 6B | BS | 100 |
| | 2-2-a | H | H | BS | 85 |
| | 2-2-b | F | 5B | BS | 100 |
| | 2-3 | H | 5B | A3003 | 100 |
| | 2-4 | H | 5B | A3003 | 100 |

Note)
Content: ratio to the solid content being 100

TABLE 3

| Classification | No. | Surface roughness Ra µm | Surface roughness Rz µm | Flux Type | Flux Average particle diameter µm | Flux Density Mg/m³ | Flux Amount to be blended mass % | Filler material Type | Filler material Average particle diameter µm | Filler material Density Mg/m³ | Filler material Amount to be blended mass % | Resin layer Content Flux mass % | Resin layer Content Filler material mass % |
|---|---|---|---|---|---|---|---|---|---|---|---|---|---|
| Example according to this invention | 2-8 | 0.71 | 5.5 | KZnF₃ | 3.9 | 2.8 | 90 | — | — | — | 0 | 88 | 0 |
| | 2-9 | 0.71 | 5.5 | KZnF₃ | 3.9 | 2.8 | 70 | — | — | — | 0 | 69 | 0 |
| | 2-10 | 0.71 | 5.5 | KZnF₃ | 3.9 | 2.8 | 50 | Si | 11.5 | 2.3 | 30 | 49 | 30 |
| | 2-11 | 0.71 | 5.5 | KZnF₃ | 26.4 | 2.8 | 90 | — | — | — | 0 | 90 | 0 |
| | 2-12 | 0.71 | 5.5 | KZnF₃ | 3.9 | 2.8 | 50 | Zn | 16.2 | 7.1 | 30 | 50 | 30 |
| | 2-13 | 0.71 | 5.5 | KZnF₃ | 3.9 | 2.8 | 50 | Ge | 8.5 | 5.3 | 30 | 50 | 30 |
| | 2-14 | 0.71 | 5.5 | KZnF₃ | 3.9 | 2.8 | 50 | Si | 30.0 | 2.3 | 30 | 50 | 30 |

TABLE 3-continued

| Classification | No. | | | | | | | | | | | |
|---|---|---|---|---|---|---|---|---|---|---|---|---|
| Comparative example | 2-5 | 0.71 | 5.5 | KZnF$_3$ | 3.9 | 2.8 | 90 | — | — | — | 0 | 88 | 0 |
| | 2-6 | 0.71 | 5.5 | KZnF$_3$ | 3.9 | 2.8 | 90 | — | — | — | 0 | 61 | 0 |
| | 2-7 | 0.71 | 5.5 | KZnF$_3$ | 3.9 | 2.8 | 90 | — | — | — | 0 | 65 | 0 |
| | 2-8 | 0.71 | 5.5 | KZnF$_3$ | 3.9 | 2.8 | 70 | — | — | — | 0 | 54 | 0 |
| | 2-9 | 0.71 | 5.5 | KZnF$_3$ | 3.9 | 2.8 | 50 | Si | 11.5 | 2.3 | 30 | 49 | 30 |
| | 2-10 | 0.71 | 5.5 | KZnF$_3$ | 3.9 | 2.8 | 50 | Si | 11.5 | 2.3 | 30 | 34 | 11 |

| | | | Properties | | | |
|---|---|---|---|---|---|---|
| | | | Adhesion property | | Brazing property | |
| Classification | No. | Coating-supplying method/ coating method | Initial stage | After immersing in oil | Corrugated fin material | Bonded ratio of fin % |
| Example according to this invention | 2-8 | Top-feed/reverse coating (3 rolls) | F | B | BS | 100 |
| | 2-9 | Top-feed/reverse coating (3 rolls) | H | HB | BS | 99 |
| | 2-10 | Top-feed/reverse coating (3 rolls) | F | B | A3003 | 100 |
| | 2-11 | Top-feed/reverse coating (3 rolls) | H | H | BS | 95 |
| | 2-12 | Top-feed/reverse coating (3 rolls) | F | F | A3003 | 95 |
| | 2-13 | Top-feed/reverse coating (3 rolls) | F | B | A3003 | 95 |
| | 2-14 | Top-feed/reverse coating (3 rolls) | H | HB | A3003 | 95 |
| Comparative example | 2-5 | Top-feed/natural coating (2 rolls) | F | B | BS | 82 |
| | 2-6 | Bottom up/reverse coating (2 rolls) | H | HB | BS | 80 |
| | 2-7 | Bottom up/reverse coating (3 rolls) | H | HB | BS | 82 |
| | 2-8 | Bottom up/reverse coating (3 rolls) | H | H | BS | 62 |
| | 2-9 | Top-feed/natural coating (2 rolls) | F | B | A3003 | 82 |
| | 2-10 | Bottom up/reverse coating (3 rolls) | F | B | A3003 | 65 |

Note)
Amount to be blended, content: ratio to the solid content being 100

From the above results, the resin-coated aluminum flat multi-cavity tube of the examples according to the present invention was excellent in the adhesion property and the brazing property. Further, according to the production method of the present invention, such a resin-coated aluminum flat multi-cavity tube excellent in the adhesion property and the brazing property, can be obtained. In each of Examples 2-11 to 2-14 according to the present invention, the average particle diameter or density of the metal powder was comparatively large, and thus the brazing property thereof was slightly lower than that of Examples 2-8 to 2-10 according to the present invention, but said property was still at a level passing the test.

Contrary to the above, among Reference Example and Comparative Example Nos. 2-1 to 2-10, in each of Nos. 2-1, 2-2, 2-3, and 2-4, the surface roughness of the flat surface of the aluminum flat multi-cavity tube was too small, and thus the adhesion property was inferior to the examples according to the present invention. In No. 2-2-a, the content of the metal powder was too low, and the brazing property was poor. In No. 2-2-b, the content of the metal powder was too high, and the adhesion property was poor. In each of Nos. 2-6 to 2-8 and No. 2-10, the coating was supplied by a bottom up system. Thus, precipitation of the metal powder in the coater pan was observed, and the content of the metal powder in the resin layer was insufficient. As a result, sufficient brazing property could not be obtained. In each of Nos. 2-5 and 2-9, roll transfer was performed by a natural system, so the distribution of the metal powder in the coated layer became uneven, resulting in poor brazing property.

Example 3-1

A flat multi-cavity tube (202) made of an A1050 aluminum alloy (19 cavities, 16 mm in width, 1.8 mm in high, 1.0 mm×0.6 mm in cavity size, and 0.3 mm in thickness) extruded by means of a conform extrusion method, was used; and both the top and back sides and both the curved portions of the tube was coated, with a coating apparatus as shown in FIGS. 19 and 20, under the conditions of a coating chamber temperature of 25° C. The moving speed of the flat multi-cavity tube at the time of application of the coating was 80 m/min. A roll transfer (single roll) system was used as a coating system for both the curved portions (202R). The applicator roll (204a) (60 mm in outer diameter) had a peripheral speed of 80 m/min. In a roll transfer device for coating both the flat portions (202F), the applicator roll (205a) (200 mm in outer diameter) with a peripheral speed of 100 m/min, the pickup roll (205p) (200 mm in outer diameter) with a peripheral speed of 50 m/min, and the metering roll (205m) (200 mm in outer diameter) with a peripheral speed of 15 m/min were utilized. A flux compound that was a solute to be used was KZnF$_3$ whose average particle diameter of 2 μm to 20 μm. The adhesion amount of the flux compound per unit area after drying was within the range of 5 g/m$^2$ to 18 g/m$^2$ with respect to each of both the curved portions (202R) and both the flat portions (202F), thereby to provide Sample Nos. 301 to 303 in Table 4. The adhesion amount of the flux compound per unit area and the average particle diameter thereof were selected, by performing experiments in advance; and in the evaluation items such as brazing property, it was confirmed that there was no trouble in use. The flux powder was mixed and stirred with an acrylic resin solution (the binder solid content of 15% by mass), at a proportion of 85:15 of the flux and the acrylic resin in terms of mass ratio, to prepare the coating (206). The coating (206) was applied on the surface of the flat multi-cavity tube (202) in a coil shape; and then the coated tube was dried in an electromagnetic inductive heating furnace (208) of 100 kW in power, 20 mm in coil inner diameter, and 2 m in furnace length (1.1 seconds in passage period, and 180° C. of the coating's actual temperature). Then, the tube thus dried was cooled by the air at room temperature, followed by winding up. The aluminum alloy flat multi-cavity tube (202) after coating was combined with a fin material (16) prepared by corrugate-forming an aluminum alloy clad sheet material (a core material, A3103; and a clad material, A4045) of 70 μm in thickness, and a header pipe material (17), to assemble a heat exchanger core, as shown in FIG. 10, followed by a brazing process at 600° C. for 5 minutes in a nitrogen gas atmosphere, to joint these.

Example 3-2

Sample Nos. 304 to 306 shown in Table 4 were prepared in the same manner as in Example 3-1, except by using the spray system as shown in FIG. 24, as a system for application of the coating on both the curved portions (202R), but other conditions were the same as those of Example 3-1. The thus-prepared coated materials were subjected to the brazing process under the same conditions as those of Example 3-1.

Example 3-3

Sample Nos. 307 to 309 shown in Table 4 were prepared in the same manner as in Example 3-1, except by using the brush system as shown in FIG. 25, as a system for application of the coating on both the curved portions (202R), but other conditions were the same as those of Example 3-1. The thus-prepared coated materials were subjected to the brazing process under the same conditions as those of Example 3-1.

Reference Example 3-1

Sample Nos. 310 to 312 were prepared in the same manner as in Example 3-1 under the same conditions such as coating's characteristics, except by applying the coating only on both the flat portions (202F) by a roll transfer system, without applying the coating on both the curved portions (202R). The thus-prepared coated materials were subjected to the brazing process under the same conditions as those of Example 3-1.

Reference Example 3-2

Sample Nos. 313 and 314 were prepared in the same manner as in Example 3-1 under the same conditions such as a system of application of the coating on both the curved portions (202R), except by utilizing $KZnF_3$ after drying in the adhesion amount as in the conditions in Table 4. The thus-prepared coated materials were subjected to the brazing process under the same conditions as those of Example 3-1.

Reference Example 3-3

Sample Nos. 315 and 316 were prepared in the same manner as in Example 3-1 under the same conditions such as a system of application of the coating on both the curved portions (202R), except by utilizing $KZnF_3$ in the particle diameter conditions as in Table 4. The thus-prepared coated materials were subjected to the brazing process under the same conditions as those of Example 3-1.

As evaluation characteristics, the brazing property and corrosion resistance were evaluated.

Regarding the brazing property, a sample for evaluation was cut from the heat exchanger core after brazing, the fin material (16) in said cut-portion was cut from the aluminum alloy flat multi-cavity tube (202), and a bonding ratio in 100 bonded portions on the bonded surface (the bonding ratio= (the number of bonded points/100)×100), was measured; and the number of un-bonded inferior fin corrugated-threads was counted; thereby evaluating the brazing property.

Regarding the corrosion resistance, from the heat exchanger core prepared by subjecting each sample to the brazing process, a mini core (200 mm×200 mm) was cut out. The cut opening portion of the flat multi-cavity tube was subjected to masking treatment, and then subjected to a CASS test in accordance to JIS Z 2371, followed by measuring the test time period up to the formation of through holes which penetrated through the test specimen, thereby evaluating the corrosion resistance.

Further, an average natural potential (mV) for each of the flat portion and the curved portion was determined.

Taking the assembling property and corrosion resistance of the heat exchanger core into consideration, the judgment levels whether a sample would pass/not pass a test of the respective evaluated characteristics, are as follows. The bonding ratio (brazing property)≧96%; the number of un-bonded corrugated-threads≦4 threads; the test time up to formation of through holes in the CASS test≧1,500 hr, were judged to pass the tests, respectively.

The results are shown in Table 4.

TABLE 4

| | | Coating conditions | | | | |
|---|---|---|---|---|---|---|
| | | Flux adhesion amount | | | Proportion of particles | |
| | Sample No. | Flat portion (g/m²) | Curved portion (g/m²) | Average particle diameter (μm) | with particle diameter of 50 μm or less (%) | Coating method on curved portion |
| Example 3-1 | 301 | 6.2 | 5.8 | 10 | 98 | Roll transfer |
| | 302 | 11.1 | 10.9 | 7 | 95 | Roll transfer |
| | 303 | 17.5 | 17.2 | 25 | 89 | Roll transfer |
| Example 3-2 | 304 | 6.5 | 6.8 | 12 | 92 | Spray |
| | 305 | 12.0 | 11.3 | 22 | 88 | Spray |
| | 306 | 16.8 | 17.8 | 8 | 91 | Spray |
| Example 3-3 | 307 | 6.0 | 6.1 | 4 | 92 | Brush |
| | 308 | 10.5 | 11.2 | 2.5 | 90 | Brush |
| | 309 | 17.3 | 17.9 | 12 | 87 | Brush |
| Reference example 3-1 | 310 | 6.5 | — | 10 | 93 | — |
| | 311 | 10.8 | — | 18 | 91 | — |
| | 312 | 17.3 | — | 14 | 89 | — |
| Reference example 3-2 | 313 | 2.5 | 2.2 | 16 | 92 | Roll transfer |
| | 314 | 19.5 | 19.8 | 18 | 92 | Roll transfer |

TABLE 4-continued

| | | | | | | |
|---|---|---|---|---|---|---|
| Reference example 3-3 | 315 | 10.8 | 11.6 | 27 | 70 | Roll transfer |
| | 316 | 9.8 | 12.3 | 35 | 68 | Roll transfer |
| | 317 | 9.5 | 10.1 | 0.6 | 99 | Roll transfer |

| | | | Evaluation results | | | |
|---|---|---|---|---|---|---|
| | | | Number of un-bonded | Results of CASS test | | Average natural potential |
| | Sample No. | Bonding ratio (%) | threads (thread) | Penetration time (hr) | Penetrated portion | Flat portion (mV) | Curved portion (mV) |
| Example 3-1 | 301 | 100 | 0 | 1,600 | Curved portion | −750 | −745 |
| | 302 | 99 | 1 | 1,670 | Flat portion | −790 | −788 |
| | 303 | 100 | 0 | 1,720 | Curved portion | −830 | −826 |
| Example 3-2 | 304 | 100 | 0 | 1,610 | Flat portion | −752 | −755 |
| | 305 | 100 | 0 | 1,690 | Flat portion | −806 | −800 |
| | 306 | 100 | 0 | 1,750 | Curved portion | −825 | −827 |
| Example 3-3 | 307 | 99 | 1 | 1,610 | Flat portion | −748 | −749 |
| | 308 | 100 | 0 | 1,690 | Curved portion | −779 | −782 |
| | 309 | 100 | 0 | 1,750 | Flat portion | −828 | −830 |
| Reference example 3-1 | 310 | 100 | 0 | 1,050 | Curved portion | −753 | −660 |
| | 311 | 100 | 0 | 970 | Curved portion | −781 | −658 |
| | 312 | 100 | 0 | 1,100 | Curved portion | −825 | −662 |
| Reference example 3-2 | 313 | 92 | 8 | 1,350 | Curved portion | −692 | −690 |
| | 314 | 88 | 12 | 1,030 | Curved portion | −920 | −925 |
| Reference example 3-3 | 315 | 90 | 10 | 1,320 | Curved portion | −780 | −785 |
| | 316 | 93 | 7 | 1,220 | Curved portion | −777 | −796 |
| | 317 | 90 | 10 | 1,060 | Curved portion | −775 | −785 |

Note 1)
"—" denotes no coating
Note 2)
In the above table, the mixing ratio of the flux and the acrylic resin solution (binder solid content, 15 mass %) was 85:15 in mass ratio of the flux to the acrylic resin
Note 3)
In the above table, the product speed = 80 m/min From Table 4, Sample Nos. 301 to 309 prepared under the conditions of Examples 3-1, 3-2 and 3-3 according to the present invention, exhibited excellent results with respect to all of the characteristics of the bonding ratio, the number of un-bonded threads, and the penetration time in the CASS test.

In contrast, the sample of each reference example had at least one poor evaluation result.

In Sample Nos. 310 to 312 of Reference Example 3-1, there was no $KZnF_3$ applied on both curved portions of the aluminum alloy heat exchanger member. Therefore, the potential of the curved portion of the member becomes electropositive, compared with that of the flat portion on which the coating was applied, resulting in occurrence of through hole corrosion at less than CASS 1,500 hr.

In Reference Example 3-2, Sample No. 313 had a too small adhesion amount of $KZnF_3$, thus the bonding ratio of the fin was poor; and further this sample failed to exhibit sufficient sacrificial corrosion preventive effect, thus through hole corrosion occurred at less than CASS 1,500 hr. Sample No. 314 had a too large adhesion amount of $KZnF_3$, thus deterioration of the bonding ratio was caused due to core breakage; and further the potential became extremely electrically negative, thus the through hole corrosion was occurred by self corrosion at an early stage.

In Reference Example 3-3, Sample Nos. 315 and 316 had a large particle diameter of $KZnF_3$, so a uniform coated layer could not be formed on both the flat portions due to deterioration in the bonding ratio with core breakage, and on the both curved portions due to unstable distribution of $KZnF_3$ in the coating, which result that areas having locally unstable potentials were formed. Therefore, through hole corrosion before CASS 1,500 hr occurred. Sample No. 317 had a too small particle diameter of $KZnF_3$, so $KZnF_3$ was chemically changed by oxidation or other such chemical reaction at the time of brazing; or an excess binder intervenes, so an effect of removing an oxide layer and a sacrificial corrosion preventive effect could not be obtained sufficiently.

INDUSTRIAL APPLICABILITY

According to the method of the present invention for producing an aluminum alloy automotive heat exchanger member, an aluminum alloy automotive heat exchanger member which is excellent in the uniform coating property and adhesion property of a flux, can be obtained. Further, the apparatus of the present invention for producing an aluminum alloy automotive heat exchanger member is preferable for reducing the number of steps of the production of the heat exchanger member or for making the producing facilities needed therein more compact; and it is preferable for carrying out the production more efficiently.

According to the method of the present invention for producing an aluminum alloy heat exchanger member, the heat exchanger member can be continuously produced at high speed, which heat exchanger member has a coated layer having a high concentration of a flux component excellent in the uniform coating property and the coated layer-adhesion property. The aluminum alloy heat exchanger member of the present invention is preferable for an automotive heat exchanger.

The resin-coated aluminum flat multi-cavity tube of the present invention is excellent in the adhesion and brazing properties, so it can be preferably used in an automotive heat exchanger. Further, according to the method of the present invention for producing a resin-coated aluminum flat multi-cavity tube, a resin-coated aluminum flat multi-cavity tube can be produced, which is high in the content of a metal powder, the distribution thereof is uniform over the entire surface, and excellent in brazing property.

According to the method of the present invention for producing an aluminum alloy automotive heat exchanger member, it becomes possible to obtain an aluminum alloy automotive heat exchanger member excellent in brazing property and corrosion resistance.

The aluminum alloy heat exchanger member of the present invention is preferable for the automotive heat exchanger.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A method of producing a resin-coated aluminum alloy flat multi-cavity tube for a heat exchanger comprising:

adjusting the surface roughness of an aluminum alloy flat multi-cavity tube so that at least one flat surface of the aluminum alloy flat multi-cavity tube has a surface roughness of a center line average roughness (Ra) of 0.4 µm or more, and a ten-point height of irregularities (Rz) of 3 µm or more, supplying, by a top-feed system, a resin coating containing a metal powder for brazing, the metal powder containing a brazing flux, an acrylic resin, and a cross-linking agent with a metal powder volume content in solid content of 50% to 90%, and prepared together with water and an organic solvent;

applying said resin coating by a reverse system to said roughened surface of said aluminium alloy flat multi-cavity tube; and drying.

2. The method of producing the resin-coated aluminum alloy flat multi-cavity tube for a heat exchanger as claimed in claim 1, wherein the metal powder has an average particle diameter of 30 µm or less and a density of 4.0 Mg/m$^3$ or less.

* * * * *